US011459922B2

(12) United States Patent
Sugimoto

(10) Patent No.: US 11,459,922 B2
(45) Date of Patent: Oct. 4, 2022

(54) ELECTRIC DUST COLLECTING APPARATUS

(71) Applicant: TOYOTA JIDOSHA KABUSHIKI KAISHA, Toyota (JP)

(72) Inventor: Kazuhiro Sugimoto, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 970 days.

(21) Appl. No.: 16/195,899

(22) Filed: Nov. 20, 2018

(65) Prior Publication Data

US 2019/0218948 A1 Jul. 18, 2019

(30) Foreign Application Priority Data

Jan. 18, 2018 (JP) ............................ JP2018-006634

(51) Int. Cl.

*B01D 53/02* (2006.01)
*F01N 3/01* (2006.01)
*B03C 3/41* (2006.01)
*F01N 13/00* (2010.01)
*F01N 3/027* (2006.01)
(Continued)

(52) U.S. Cl.

CPC .................. *F01N 3/01* (2013.01); *B03C 3/41* (2013.01); *B03C 3/45* (2013.01); *B03C 3/49* (2013.01); *F01N 3/0275* (2013.01); *F01N 13/0097* (2014.06); *B03C 2201/10* (2013.01); *B03C 2201/24* (2013.01); *B03C 2201/30* (2013.01)

(58) Field of Classification Search

CPC ............ B03C 2201/10; B03C 2201/24; B03C 2201/30; B03C 3/41; B03C 3/45; B03C 3/49; F01N 13/0097; F01N 2900/1404; F01N 3/01; F01N 3/027; F01N 3/0275

See application file for complete search history.

(56) References Cited

U.S. PATENT DOCUMENTS

2004/0025497 A1 2/2004 Truce
2014/0007650 A1 1/2014 Mitani et al.
(Continued)

FOREIGN PATENT DOCUMENTS

CN 1533843 A 10/2004
CN 103443411 A 12/2013
CN 104379263 A 2/2015
(Continued)

*Primary Examiner* — Christopher P Jones
(74) *Attorney, Agent, or Firm* — Oblon, McClelland, Maier & Neustadt, L.L.P.

(57) ABSTRACT

The electric dust collecting apparatus comprises a plurality of discharge electrodes that are disposed in an exhaust flow passage, a ground electrode that constitutes at least a part of an inner wall surface of the exhaust flow passage, and a voltage applying device that is configured to apply voltage selectively from a common power supply to each of the plurality of discharge electrodes. The plurality of discharge regions, each of which includes at least one discharge electrode, are provided in the exhaust flow passage and an electrode-to-electrode distance between the discharge electrode and the ground electrode is different in each of the plurality of discharge regions. The voltage applying device applies voltage to the discharge electrode for each discharge region, and changes the discharge region where voltage is applied to the discharge electrode in accordance with exhaust gas temperature.

20 Claims, 20 Drawing Sheets

(51) Int. Cl.

| | |
|---|---|
| ***B03C 3/45*** | (2006.01) |
| ***B03C 3/49*** | (2006.01) |

(56) References Cited

U.S. PATENT DOCUMENTS

| | | | |
|---|---|---|---|
| 2015/0113959 | A1 | 4/2015 | Mitani et al. |
| 2018/0306086 | A1 | 10/2018 | Sugimoto |

FOREIGN PATENT DOCUMENTS

| | | | |
|---|---|---|---|
| EP | 2 998 528 | A1 | 3/2016 |
| JP | 63-185462 | U | 11/1988 |
| JP | 3-15651 | U | 2/1991 |
| JP | 6-159035 | | 6/1994 |
| JP | 2005-232971 | | 9/2005 |
| JP | 2012-504485 | A | 2/2012 |
| JP | 2012-136954 | | 7/2012 |
| JP | 2012-193698 | | 10/2012 |
| JP | 2012-219746 | | 11/2012 |
| JP | 2013-160176 | | 8/2013 |
| JP | 2014-084783 | | 5/2014 |
| JP | 2014-238086 | | 12/2014 |
| JP | 2017-952 | A | 1/2017 |
| WO | WO 2012/124091 | A1 | 9/2012 |
| WO | WO 2013/179381 | A1 | 12/2013 |

ELECTRIC DUST COLLECTING APPARATUS

CROSS-REFERENCE TO RELATED APPLICATION

This application claims priority to Japanese Patent Application No. 2018-006634, filed on Jan. 18, 2018, which is incorporated by reference herein in its entirety.

BACKGROUND

Field

The present disclosure relates to an electric dust collecting apparatus, especially an electric dust collecting apparatus that is suitably used for collecting particulate matter included in exhaust gas from an internal combustion engine, particularly gasoline engine.

Background Art

For example, as disclosed in JP2014-084783A, an electric dust collecting apparatus is known that has a discharge electrode arranged at the axial center of a cylindrical housing that serves as a ground electrode. The electric dust collecting apparatus makes the particulate matter in the exhaust gas be charged by the discharge from the discharge electrode, and collects the charged particulate matter by the ground electrode. JP2014-084783A discloses using the electric dust collecting apparatus to collect the particulate matter exhausted from a gasoline engine or a diesel engine.

However, as a result of experiments by the inventors of the present application, it has been found that a conventional electric dust collecting apparatus as disclosed in JP2014-084783A makes a large difference in dust collecting performance between when applied to the gasoline engine and when applied to the diesel engine. This is explained with reference to the graphs of FIGS. 18, 19, and 20 obtained from experiments. In each graph, the results of the experiments obtained by using the diesel engine are plotted with square marks, and the results of experiments obtained by using the gasoline engine are plotted with rhombuses.

FIG. 18 is a graph showing a relation between a maximum applied voltage capable of being applied to the discharge electrode and a collection efficiency of particulate matter. As can be seen from the graph, the collection efficiency is increased as the voltage applied to the discharge electrode is increased. As the result, the collection efficiency in the gasoline engine is generally lower than the collection efficiency in the diesel engine. This is due to a difference in an exhaust gas temperature between the gasoline engine and the diesel engine.

FIG. 19 is a graph showing a relation between a temperature of exhaust gas entering the electric dust collecting apparatus and a collection efficiency of particulate matter. As can be seen from the graph, the collection efficiency is decreased as the exhaust gas temperature becomes high. This is due to that the maximum applied voltage capable of being applied to the discharge electrode is decreased because a dielectric breakdown voltage between the discharge electrode and the ground electrode is decreased as a temperature becomes high. When comparing the gasoline engine and the diesel engine, the gasoline engine is higher in a combustion temperature than the diesel engine. As the result, as shown in FIG. 18, it is determined that the maximum applied voltage is entirely low in the gasoline engine and the collection efficiency is low compared to the diesel engine.

FIG. 20 is a graph showing a relation between an engine load (intake air amount Ga) and a collection efficiency of particulate matter. Generally, as the engine load is increased, a combustion temperature becomes high and an exhaust gas temperature becomes high too. However, in case of the diesel engine, the combustion temperature doesn't become so high even when the engine load is increased, and the exhaust gas temperature is suppressed low. As the result, in the diesel engine, a constant high collection efficiency is maintained irrespective of the magnitude of the engine load. On the contrary, when comparing under the same engine load, the gasoline engine is higher in the combustion temperature than the diesel engine, and also higher in the exhaust gas temperature than the diesel engine. Therefore, the gasoline engine can't obtain only the low collection efficiency except for an extremely low engine load, and may lose the dust collecting performance when the engine load is increased to some extent large.

As described above, because the dust collecting performance of the conventional electric dust collecting apparatus depends on the exhaust gas temperature greatly, it is difficult to collect the particulate matter contained in the exhaust gas in a wide temperature region. The dielectric breakdown voltage depends on not only the exhaust gas temperature but also an electrode-to-electrode distance between the discharge electrode and the ground electrode. Therefore, if suppressing a dielectric breakdown in a high-temperature region is an only object, it is enough to enlarge the electrode-to-electrode distance. However, simply enlarging the electrode-to-electrode distance decreases the charging performance due to the reduction of the electric field intensity between the electrodes, so that the dust collecting performance in a low-temperature region also decreases. For this reason, if the source of particulate matter is such one of which the exhaust gas temperature varies greatly from low temperature to high temperature like the gasoline engine, it is difficult to obtain gratifying dust collecting performance even though the conventional electric dust collecting apparatus is applied.

Note that, in addition to the above described patent literature, JP2013-160176A, JP2014-238086A, JP2012-193698A, JP2012-219746A, JP06-159035A, JP2012-136954, and JP2005-232971A may be mentioned as examples of literature describing the state-of-the-art at the time of filing the present application.

SUMMARY

The present disclosure has been devised in view of such problems, and an object of the present disclosure is to provide an electric dust collecting apparatus of which the temperature region where particulate matter is collected is enlarged up to the high-temperature region while keeping the dust collecting performance in the low-temperature region.

To achieve the above object, a first electric dust collecting apparatus according to the present disclosure is an electric dust collecting apparatus that charges and collects particulate matter contained in exhaust gas, and is configured as below.

The first electric dust collecting apparatus according to the present disclosure comprises a plurality of discharge electrodes that are disposed in an exhaust flow passage, a ground electrode that constitutes at least a part of an inner wall surface of the exhaust flow passage, and a voltage applying device that is configured to apply voltage selectively from a common power supply to each of the plurality of discharge electrodes. The plurality of discharge electrodes may be arranged at least in the direction of exhaust gas flow. The ground electrode may be located in the radius direction of the exhaust flow passage for each of the discharge electrodes. A plurality of discharge regions, each of which includes at least one discharge electrode, are provided in the exhaust flow passage and an electrode-to-electrode distance between the discharge electrode and the ground electrode is different in each of the plurality of discharge regions. The voltage applying device applies voltage to the discharge electrode for each discharge region, and changes the discharge region where voltage is applied to the discharge electrode in accordance with exhaust gas temperature.

According to the above configuration, voltage is applied to the discharge electrode having the electrode-to-electrode distance suitable for the exhaust gas temperature, and thereby the temperature region where particulate matter is collected is enlarged up to the high-temperature region while keeping the dust collecting performance in the low-temperature region.

In the first electric dust collecting apparatus according to the present disclosure, the voltage applying device may vary the voltage applied to the discharge electrode in accordance with the exhaust gas temperature. The maximum applied voltage that is applicable to the discharge electrode within a range where a dielectric breakdown doesn't occur depends on the exhaust gas temperature. Therefore, the dust collecting performance in each temperature region is improved by varying the applied voltage in accordance with the exhaust gas temperature.

In an embodiment of the first electric dust collecting apparatus according to the present disclosure, the temperature region where voltage is applied to the discharge electrode may be set at a lower temperature side in the discharge region having the shorter electrode-to-electrode distance than in the discharge region having the longer electrode-to-electrode distance. As the electrode-to-electrode distance is shorter, the electric field intensity is higher so that the higher collection efficiency is achieved. However, on the other hand, as the exhaust gas temperature is higher, the dielectric breakdown is easier to happen. Therefore, according to this setting, in the low-temperature region where the exhaust gas temperature is low, particulate matter is collected at a high collection efficiency in the discharge region where the electrode-to-electrode distance is short. Also, according to the above configuration, in the high-temperature region where the high-temperature region is high, collecting particulate matter is continued in the discharge region where the electrode-to-electrode distance is long.

In the embodiment described above, the voltage applying device may comprise a selector switch that changes the discharge electrode connected to the common power supply for each discharge region. In this case, the voltage applying device may operate the selector switch to select the discharge region where voltage is applied to the discharge electrode in accordance with the temperature region to which the exhaust gas temperature belongs. According to this configuration, by operating the selector switch, the common power supply is connected to the discharge electrode having the most suitable electrode-to-electrode distance for the exhaust gas temperature.

Also, in the embodiment described above, the voltage applying device may set the voltage applied to the discharge electrode higher in the discharge region having the longer electrode-to-electrode distance than in the discharge region having the shorter electrode-to-electrode distance. As the electrode-to-electrode distance is longer, the dielectric breakdown voltage is larger so that there becomes a room for raising the applied voltage. If the applied voltage is the same, the collection efficiency is lower as the electrode-to-electrode distance is longer. However, by raising the applied voltage, the collection efficiency in the discharge region where the electrode-to-electrode distance is long increases.

In another embodiment of the first electric dust collecting apparatus according to the present disclosure, an upper limit temperature of the temperature region where voltage is applied to the discharge electrode may be set lower in the discharge region having the shorter electrode-to-electrode distance than in the discharge region having the longer electrode-to-electrode distance. If the exhaust gas temperature is the same, the collection efficiency is higher in the discharge region where the electrode-to-electrode distance is short than in the discharge region where the electrode-to-electrode distance is long. However, further higher collection efficiency is achieved by applying voltage to both the discharge regions. Therefore, according to this setting, collecting particulate matter is continued in each discharge region until the exhaust gas temperature reaches the upper limit temperature, and thereby, high dust collecting performance is achieved as a whole.

In the other embodiment described above, the voltage applying device may comprise an on-off switch that turns on and off the connection between the common power supply and the discharge electrode for each discharge region. In this case, when the exhaust gas temperature has reached the upper limit temperature set for a certain discharge region, the voltage applying device may operate the on-off switch to turn off the connection between the common power supply and the discharge electrode in the certain discharge region corresponding to the upper limit temperature which the exhaust gas temperature has reached. Further, when the exhaust gas temperature falls below the upper limit temperature set for a certain discharge region, the voltage applying device may operate the on-off switch to turn on the connection between the common power supply and the discharge electrode in the certain discharge region corresponding to the upper limit temperature which the exhaust gas temperature has fallen below. According to this configuration, by operating the on-off switch, the common power supply is connected to all the discharge electrodes at which a dielectric breakdown doesn't happen.

Also, in the other embodiment described above, an applicable voltage that is applicable to the discharge electrode may set lower in the discharge region having the shorter electrode-to-electrode distance than in the discharge region having the longer electrode-to-electrode distance. In this case, the voltage applying device may set the applicable voltage set for the discharge region having the shortest electrode-to-electrode distance among target discharge regions where voltage is applied to the discharge electrode as the applied voltage for all the target discharge regions. According to this, it is possible to prevent a short circuit caused by the applied voltage exceeding the dielectric breakdown voltage in any of the discharge regions.

To achieve the above object, a second electric dust collecting apparatus according to the present disclosure is an electric dust collecting apparatus that charges and collects particulate matter contained in exhaust gas, and is configured as below.

The second electric dust collecting apparatus according to the present disclosure comprises a plurality of discharge electrodes that are disposed in an exhaust flow passage, a ground electrode that constitutes at least a part of an inner wall surface of the exhaust flow passage, and a voltage applying device that is configured to apply voltage to each of the plurality of discharge electrodes. A plurality of discharge regions, each of which includes at least one discharge electrode, are provided in the exhaust flow passage and an electrode-to-electrode distance between the discharge electrode and the ground electrode is different in each of the plurality of discharge regions. The voltage applying device applies voltage from an individual power supply that is provided for each of the plurality of discharge regions to the discharge electrode for each discharge region, and changes the discharge region where voltage is applied to the discharge electrode in accordance with exhaust gas temperature.

According to the above configuration, voltage is applied to the discharge electrode having the electrode-to-electrode distance suitable for the exhaust gas temperature, and thereby the temperature region where particulate matter is collected is enlarged up to the high-temperature region while keeping the dust collecting performance in the low-temperature region.

In the second electric dust collecting apparatus according to the present disclosure, the voltage applying device may vary the voltage applied to the discharge electrode in accordance with the exhaust gas temperature. The maximum applied voltage that is applicable to the discharge electrode within a range where a dielectric breakdown doesn't occur depends on the exhaust gas temperature. Therefore, the dust collecting performance in each temperature region is improved by varying the applied voltage in accordance with the exhaust gas temperature.

In the second electric dust collecting apparatus according to the present disclosure, an upper limit temperature of the temperature region where voltage is applied to the discharge electrode may be set lower in the discharge region having the shorter electrode-to-electrode distance than in the discharge region having the longer electrode-to-electrode distance. If the exhaust gas temperature is the same, the collection efficiency is higher in the discharge region where the electrode-to-electrode distance is short than in the discharge region where the electrode-to-electrode distance is long. However, further higher collection efficiency is achieved by applying voltage to both the discharge regions. Therefore, according to this setting, collecting particulate matter is continued in each discharge region until the exhaust gas temperature reaches the upper limit temperature, and thereby, high dust collecting performance is achieved as a whole. Further, by using the individual power supply for each discharge region, even if a short circuit occurs due to a dielectric breakdown in a certain discharge region, it does not affect other discharge regions.

In the first electric dust collecting apparatus and the second electric dust collecting apparatus according to the present disclosure, the voltage applying device may correct the voltage applied to the discharge electrode in accordance with an estimated deposit amount of the particulate matter deposited on the discharge electrode or the ground electrode. When particulate matter is deposited on the discharge electrode or the ground electrode, the electrode-to-electrode distance in appearance varies and the relation between the exhaust gas temperature and the dielectric breakdown voltage also varies. Therefore, by correcting the voltage applied to the discharge electrode in accordance with the estimated deposit amount of the particulate matter, decrease of the dust collecting performance due to the dielectric breakdown is suppressed.

Further, in the first electric dust collecting apparatus and the second electric dust collecting apparatus according to the present disclosure, to make the electrode-to-electrode distance different in each of the plurality of discharge regions, a configuration may be adopted that a distance from an axis center of the discharge electrode to the ground electrode is identical among the plurality of discharge regions and a length from the axis center to a tip of the discharge electrode is different in each of the plurality of discharge regions. Also, to make the electrode-to-electrode distance different in each of the plurality of discharge regions, a configuration may be adopted that a distance from an axis center of the discharge electrode to the ground electrode is different in each of the plurality of discharge regions and a length from the axis center to a tip of the discharge electrode is identical among the plurality of discharge regions. In these configurations, the electric dust collecting apparatus may comprise a housing, in which the plurality of discharge regions are provided, installed in an exhaust pipe. Especially in the later configuration, the plurality of discharge regions may be provided separately at parts having different diameters in an exhaust pipe.

As described above, according to the first electric dust collecting apparatus and the second electric dust collecting apparatus according to the present disclosure, voltage is applied to the discharge electrode having the electrode-to-electrode distance suitable for the exhaust gas temperature, and thereby the temperature region where particulate matter is collected is enlarged up to the high-temperature region while keeping the dust collecting performance in the low-temperature region.

DETAILED DESCRIPTION

Hereunder, embodiments of the present disclosure will be described with reference to the drawings. Note that when the numerals of numbers, quantities, amounts, ranges and the like of respective elements are mentioned in the embodiments shown as follows, the present disclosure is not limited to the mentioned numerals unless specially explicitly described otherwise, or unless the disclosure is explicitly specified by the numerals theoretically. Furthermore, structures and steps that are described in the embodiments shown as follows are not always indispensable to the disclosure unless specially explicitly shown otherwise, or unless the disclosure is explicitly specified by the structures theoretically.

1. First Embodiment

A first embodiment of the present disclosure will be described.

Figure 1:
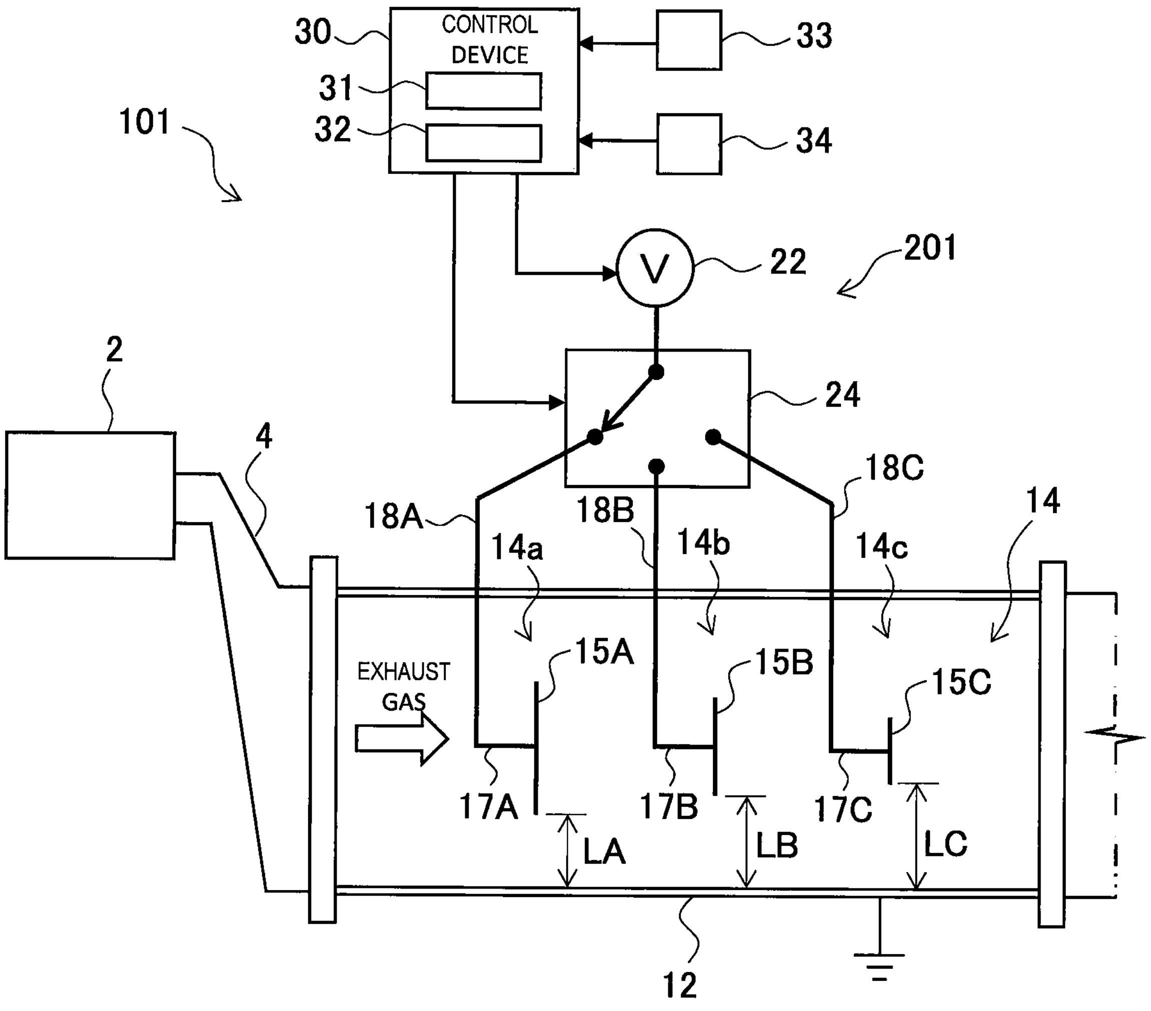
FIG. 1 is a view illustrating a configuration of an electric dust collecting apparatus according to a first embodiment of the present disclosure.

1-1. Configuration of Electric Dust Collecting Apparatus According to First Embodiment First, the configuration of the electric dust collecting apparatus according to the first embodiment will be described. FIG. 1 is a view illustrating the configuration of the electric dust collecting apparatus according to the first embodiment. The electric dust collecting apparatus 100 is an electric dust collecting apparatus for an automobile and is installed in an exhaust pipe 4 of an internal combustion engine 2. Specifically, the internal combustion engine 2 is a gasoline engine, and the electric dust collecting apparatus 100 is provided on the upstream side of the exhaust pipe 4 with respect to the catalytic converter (not shown). The present disclosure is suitable for a gasoline engine, particularly a gasoline engine that is operated at a stoichiometric air-fuel ratio. However, the internal combustion engine 2 to which the present disclosure is applied is not limited to the gasoline engine. For example, the internal combustion engine 2 may be a diesel engine.

The electric dust collecting apparatus 101 has a cylindrical housing 12, and the internal space 14 partitioned by the housing 12 becomes a flow path through which the exhaust gas flows. Hereinafter, this internal space is referred to as exhaust flow passage. The electric dust collecting apparatus is a device that collects particulate matter (hereinafter referred to as PM) contained in the exhaust gas flowing through the exhaust flow passage by charging PM by corona discharge.

The electric dust collecting apparatus 101 comprises a plurality of discharge electrodes 15A, 15B, 15C arranged at fixed intervals in the direction of exhaust gas flow. Each discharge electrode 15A, 15B, 15C extends radially from an axis part 17A, 17B, 17C arranged on the axis of the exhaust flow passage 14 to the radius direction of the exhaust flow passage 14. The electric dust collecting apparatus 101 includes the housing 12 forming an inner wall surface of the exhaust flow passage 14 as a ground electrode paired with the discharge electrode 15A, 15B, 15C. The housing 12 is conductive and grounded at least in a part surrounding the discharge electrode 15A, 15B, 15C. The conductive part functions as the ground electrode.

The discharge electrodes 15A, 15B, 15C are differentiated in the length from the axis part 17A, 17B, 17C to the tip in the radius direction for each discharge electrode. Specifically, among the three discharge electrodes 15A, 15B, 15C shown in FIG. 1, the discharge electrode 15A is the longest and the discharge electrode 15C is the shortest. The inner diameter of the housing 12 that is the ground electrode is constant at least around the discharge electrodes 15A, 15B, 15C. As the result, the electrode-to-electrode distances from the discharge electrodes 15A, 15B, 15C to the housing 12 as the ground electrode are different for each discharge electrode. Specifically, the electrode-to-electrode distance LA from the discharge electrode 15A to the ground electrode is the shortest, the electrode-to-electrode distance LC from the discharge electrode 15C to the ground electrode is the longest, and the electrode-to-electrode distance LB from the discharge electrode 15B to the ground electrode is an intermediate distance.

The exhaust flow passage 14 of the electric dust collecting apparatus 101 can be divided into a plurality of discharge regions having a different electrode-to-electrode distance. Hereafter, the discharge region where the discharge electrode 15A discharges is referred as the discharge region 14*a*, the discharge region where the discharge electrode 15B discharges is referred as the discharge region 14*b*, and the discharge region where the discharge electrode 15C discharges is referred as the discharge region 14*c*. As described below, the electric dust collecting apparatus 101 is configured to apply voltage to the discharge electrodes 15A, 15B, 15C for each discharge region.

The electric dust collecting apparatus 101 comprises a voltage applying device 201 for applying voltage to the discharge electrodes 15A, 15B, 15C. The voltage applying device 201 includes a power supply 22 for generating DC voltage and a selector switch 24. The power supply 22 is connected to an input terminal of the selector switch 24. The selector switch 24 includes three output terminals, to each of which conductors 18A, 18B, 18C are connected. The tip of the conductor 18A is connected to the axis part 17A of the discharge electrode 15A, the tip of the conductor 18B is connected to the axis part 17B of the discharge electrode 15B, and the tip of the conductor 18C is connected to the axis part 17C of the discharge electrode 15C. According to this configuration, the voltage applying device 201 can apply voltage selectively from the common power supply 22 to each of the discharge electrodes 15A, 15B, 15C by switching the selection of the selector switch 24. As the power supply 22 is common between the discharge electrodes 15A, 15B, 15C, it is referred as the common power supply 22 hereafter.

The voltage applying device 201 includes a control device 30 for controlling the common power supply 22 and the selector switch 24. The control device 30 is an electronic control unit comprising at least one processor 31 and at least one memory 32. A computer program stored in the memory 32 is read out and executed by the processor 31, whereby various functions are realized in the control device 30.

Various sensors such as an engine speed sensor 33 and an air flow meter 34 are electrically connected to the control device 30. The control device 30 obtains input information required for electrode switching control and applied voltage control from these various sensors. For example, an intake air flow rate that is a flow rate of air inhaled in the internal combustion engine 2 is obtained from the signal of the air flow meter 34, and a flow rate of exhaust gas that is processed by the electric dust collecting apparatus 10 is obtained from the intake air flow late. The engine load of the internal combustion engine 2 is obtained from the intake air flow rate obtained from the signal of the air flow meter 34 and the engine speed obtained from the signal of the engine speed sensor 33. Once the engine load of the internal combustion engine and the engine speed are determined, the operating condition of the internal combustion engine 2 is specified and the amount of PM contained in the exhaust gas and the exhaust gas temperature can be obtained from the operating state of the internal combustion engine 2.

1-2. Operation of Electric Dust Collecting Apparatus of First Embodiment

Next, an overview of the operation of the electric dust collecting apparatus 101 having the above configuration will be outlined. When the common power supply 22 and any one of the discharge electrodes 15A, 15B, 15C are connected by the selector switch 24 and voltage is applied, corona discharge occurs at the tip portion of the discharged electrode to which voltage is applied, an electric field is formed between the discharge electrode to which voltage is applied and the inner wall surface of the housing 12 as the ground electrode. As a result, ions jump out from the discharge electrode toward the housing 12, and PM contained in the exhaust gas is negatively charged. The negatively charged PM is led to the housing 12 side by ion wind and collected on the inner wall surface of the housing 12.

The collected PM is naturally burned and removed during the fuel cut operation of the internal combustion engine 2. Specifically, the exhaust gas temperature of the gasoline engine is high, and thereby the temperature inside the electric dust collecting apparatus 101 is also high. If sufficient oxygen is supplied under such a high temperature environment, the three conditions of combustion are satisfied, so that the PM deposited on the housing 12 burns. During the fuel cut operation, the exhaust gas containing a large amount of oxygen flows into the electric dust collecting apparatus 101, so that the three conditions of combustion are naturally satisfied. In the present embodiment, the collected PM is burned using the fuel cut operation, but a device for oxidizing and burning the collected PM may be separately provided.

Figure 2:
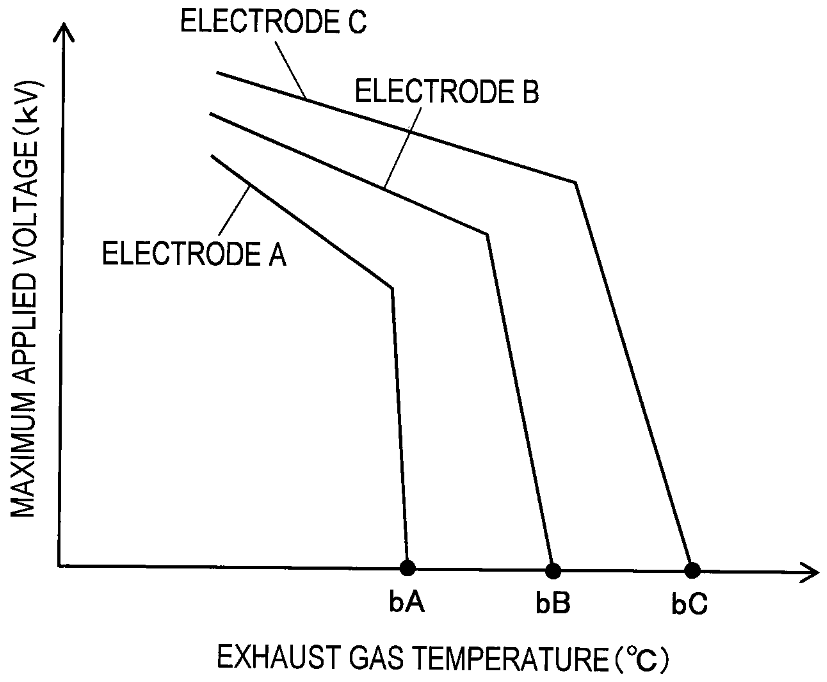
FIG. 2 is a diagram showing the relation between an exhaust gas temperature, an electrode-to-electrode distance and a maximum applied voltage.

1-3. Overview of Electrode Switching Control and Applied Voltage Control of First Embodiment FIG. 2 is a diagram showing the relation between an exhaust gas temperature and a maximum applied voltage in each electrode. The maximum applied voltage is the maximum voltage that is applicable without causing dielectric breakdown. Note that the electrode A in FIG. 2 means the discharge electrode 15A shown in FIG. 1, the electrode B in FIG. 2 means the discharge electrode 15B shown in FIG. 1, and the electrode C in FIG. 2 means the discharge electrode 15C shown in FIG. 1. Also in the following description, the discharge electrode 15A, the discharge electrode 15B, and the discharge electrode 15C may be sometimes referred to as electrode A, electrode B, and electrode C, respectively. Further, in the following description, when simply referred to as "electrode", it means the discharge electrode, not the ground electrode.

As described in "Configuration of electric dust collecting apparatus", the electrode A, B, C has a different electrode-to-electrode distance. Therefore, FIG. 2 can also be said to be a diagram showing the relation between the exhaust gas temperature, the electrode-to-electrode distance and the maximum applied voltage. As shown in FIG. 2, in any discharge electrode, the maximum applied voltage decreases as the exhaust gas temperature increases and the maximum applied voltage becomes zero or nearly zero at a certain temperature. In the present specification, a temperature at which the maximum applied voltage decreases to zero or a predetermined value close to zero (for example, about 5 kv) is defined as a dielectric breakdown temperature at which dielectric breakdown occurs between the discharge electrode and the ground electrode. In FIG. 2, the dielectric breakdown temperature of the electrode A is referred as bA, the dielectric breakdown temperature of the electrode B is referred as bB, and the dielectric breakdown temperature of the electrode C is referred as bC. Also, the maximum applied voltage decreases as the electrode-to-electrode distance decreases, as can be seen from the fact that, when the exhaust gas temperature is the same, the maximum applied voltage of the electrode A is the lowest and the maximum applied voltage of the electrode C is the highest. These relations, which hold between the exhaust gas temperature, the electrode-to-electrode distance and the maximum applied voltage, follow Paschen's law.

Now, from the viewpoint of suppressing the energy consumption of the whole system, if the same dust collecting efficiency can be obtained, the applied voltage should be as small as possible. When comparing the dust collecting efficiency of PM between the electrodes A, B, C that have different electrode-to-electrode distances, if the magnitude of the applied voltage is the same, the highest dust collecting efficiency is obtained by the electrode A that has the shortest electrode-to-electrode distance. The second highest dust collecting efficiency is obtained by the electrode B that has the second shortest electrode-to-electrode distance. The dust collecting efficiency obtained by the electrode C that has the longest electrode-to-electrode distance is the lowest.

However, there is a limit of the exhaust gas temperature under which the electrode A can be used, and the electrode A cannot be used in the temperature region higher than the dielectric breakdown temperature bA. That is, the dielectric breakdown temperature bA is an upper limit temperature of the temperature region where voltage is applied to the electrode A. Likewise, the electrode B, which can obtain the second highest dust collecting efficiency after the electrode A, can be used up to the dielectric breakdown temperature bB higher than the dielectric breakdown temperature bA, but cannot be used in the temperature region higher than that. The dielectric breakdown temperature bB is an upper limit temperature of the temperature region where voltage is applied to the electrode B. On the other hand, the electrode C cannot obtain high dust collecting efficiency, but can be used up to the temperature region that does not exceed the dielectric breakdown temperature bC higher than the dielectric breakdown temperature bB. The dielectric breakdown temperature bC is an upper limit temperature of the temperature region where voltage is applied to the electrode C.

Thus, the electrodes A, B, C have not only differences in the dust collecting efficiency obtained by discharging but also constraints on the available temperature region. The electrode switching control and applied voltage control of the first embodiment are controls for enlarging the temperature region where particulate matter can be collected up to the high-temperature region while keeping the dust collecting performance in the low-temperature region under the difference and constraints.

Figure 3:
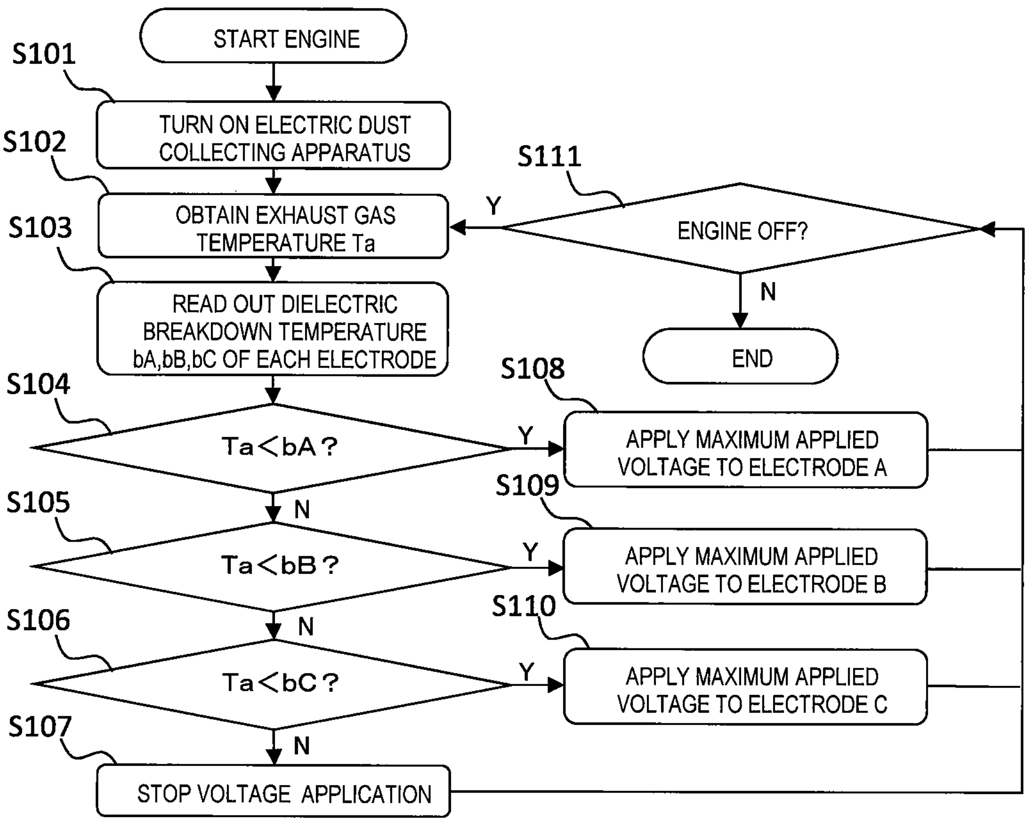
FIG. 3 is a flowchart illustrating control flows of electrode switching control and applied voltage control according to the first embodiment of the present disclosure.

1-4. Detail of Electrode Switching Control and Applied Voltage Control of First Embodiment FIG. 3 is a flowchart illustrating control flows of the electrode switching control and applied voltage control according to the first embodiment. The electrode switching control and applied voltage control are executed by the voltage applying device 201. Specifically, the control device 30 of the voltage applying device 201 controls the common power supply 22 and the selector switch 24 in accordance with the control flows shown in FIG. 3.

The electrode switching control and applied voltage control are started by starting the internal combustion engine 2 (engine starting). First, in step S101, the electric dust collecting apparatus 101 is turned on. Specifically, power is applied to the control device 30 of the voltage applying device 201.

Next, in step S102, the exhaust gas temperature Ta of the exhaust gas that flows into the exhaust flow passage 14 of the electric dust collecting apparatus 101 is obtained. The exhaust gas temperature Ta is obtained by using a map that uses engine speed and engine load as arguments. The engine speed is obtained from the signal of the engine speed sensor 33. The engine load is calculated from the engine speed and the intake air flow rate obtained from the signal of the air flow meter 34.

Next, in step S103, the dielectric breakdown temperatures bA, bB, bC of the respective electrodes A, B, C are read out from the memory 32. The dielectric breakdown temperatures bA, bB, bC are unique values of the system, and the values investigated beforehand are stored in the memory 32 of the control device 30.

Next, in step S104, the exhaust gas temperature Ta obtained in step S102 is compared with the dielectric breakdown temperature bA of the electrode A that has the shortest electrode-to-electrode distance. When the exhaust gas temperature Ta is lower than the dielectric breakdown temperature bA, the processing of step S108 is selected. In step S108, the selector switch 24 is controlled to connect the common power supply 22 and the electrode A (discharge electrode 15A), and the common power supply 22 is controlled to apply the maximum applied voltage to the electrode A. As a result, in the low-temperature region where the exhaust gas temperature is low, corona discharge occurs at the electrode A that provides high dust collecting efficiency, and PM charged thereby is collected on the ground electrode. Note that the maximum applied voltages applicable to the respective electrodes are determined in accordance with the exhaust gas temperature as shown in FIG. 2. The memory 32 of the control device 30 stores a map to relate the maximum applied voltage and the exhaust gas temperature prepared for each electrode.

When the exhaust gas temperature Ta rises up to the dielectric breakdown temperature bA or higher, because the dielectric breakdown occurs if voltage is applied to the electrode A, the electrode A can no longer be used. In this case, in step S105, the exhaust gas temperature Ta obtained in step S102 is compared with the dielectric breakdown temperature bB of the electrode B that has the second shortest electrode-to-electrode distance. When the exhaust gas temperature Ta is lower than the dielectric breakdown temperature bB, the processing of step S109 is selected. In step S109, the selector switch 24 is controlled to connect the common power supply 22 and the electrode B (discharge electrode 15B), and the common power supply 22 is controlled to apply the maximum applied voltage to the electrode B. As a result, corona discharge continues to occur at the electrode B, and PM charged thereby is collected on the ground electrode. Note that the maximum applied voltages that is applied to the electrode B is determined in accordance with the exhaust gas temperature by using the aforementioned map.

When the exhaust gas temperature Ta rises up to the dielectric breakdown temperature bB or higher, because the dielectric breakdown occurs if voltage is applied to the electrode B, not only the electrode A but also the electrode B can no longer be used. In this case, in step S106, the exhaust gas temperature Ta obtained in step S102 is compared with the dielectric breakdown temperature bC of the electrode C that has the longest electrode-to-electrode distance. When the exhaust gas temperature Ta is lower than the dielectric breakdown temperature bC, the processing of step S110 is selected. In step S110, the selector switch 24 is controlled to connect the common power supply 22 and the electrode C (discharge electrode 15C), and the common power supply 22 is controlled to apply the maximum applied voltage to the electrode C. As a result, also in the high-temperature region where the exhaust gas temperature is high, corona discharge continues to occur at the electrode C, and PM charged thereby is collected on the ground electrode. Note that the maximum applied voltages that is applied to the electrode C is determined in accordance with the exhaust gas temperature by using the aforementioned map.

When the exhaust gas temperature Ta rises up to the dielectric breakdown temperature bC or higher, because the dielectric breakdown occurs if voltage is applied to the electrode C, not only the electrodes A and B but also the electrode C can no longer be used. In this case, in step S107, the common power supply 22 is controlled to stop applying voltage.

After the processing of step S108, S109, S110 or S107, the determination of step S111 is executed. In step S111, it is determined whether the internal combustion engine 2 is in operation (that is, whether the engine is on). While the internal combustion engine 2 is operating, the above series of processing are repeatedly executed, and collecting PM contained in the exhaust gas is continued. When the fuel cut operation of the internal combustion engine 2 is performed in such a situation, the exhaust gas containing a large amount of oxygen is supplied into the exhaust flow passage 14, and the collected PM is burned and removed. When the operation of internal combustion engine 2 ends, control flows of the electrode switching control and applied voltage control come to an end.

By executing the electrode switching control and applied voltage control according to the above control flows, in the low-temperature region where the exhaust gas temperature is low, PM is collected with high collection efficiency in the discharge region having short electrode-to-electrode distance. In the high-temperature region where the exhaust gas temperature is high, collecting PM is continued in the discharge region having long electrode-to-electrode distance.

1-5. Configuration of Modification of Electric Dust Collecting Apparatus

Figure 4:
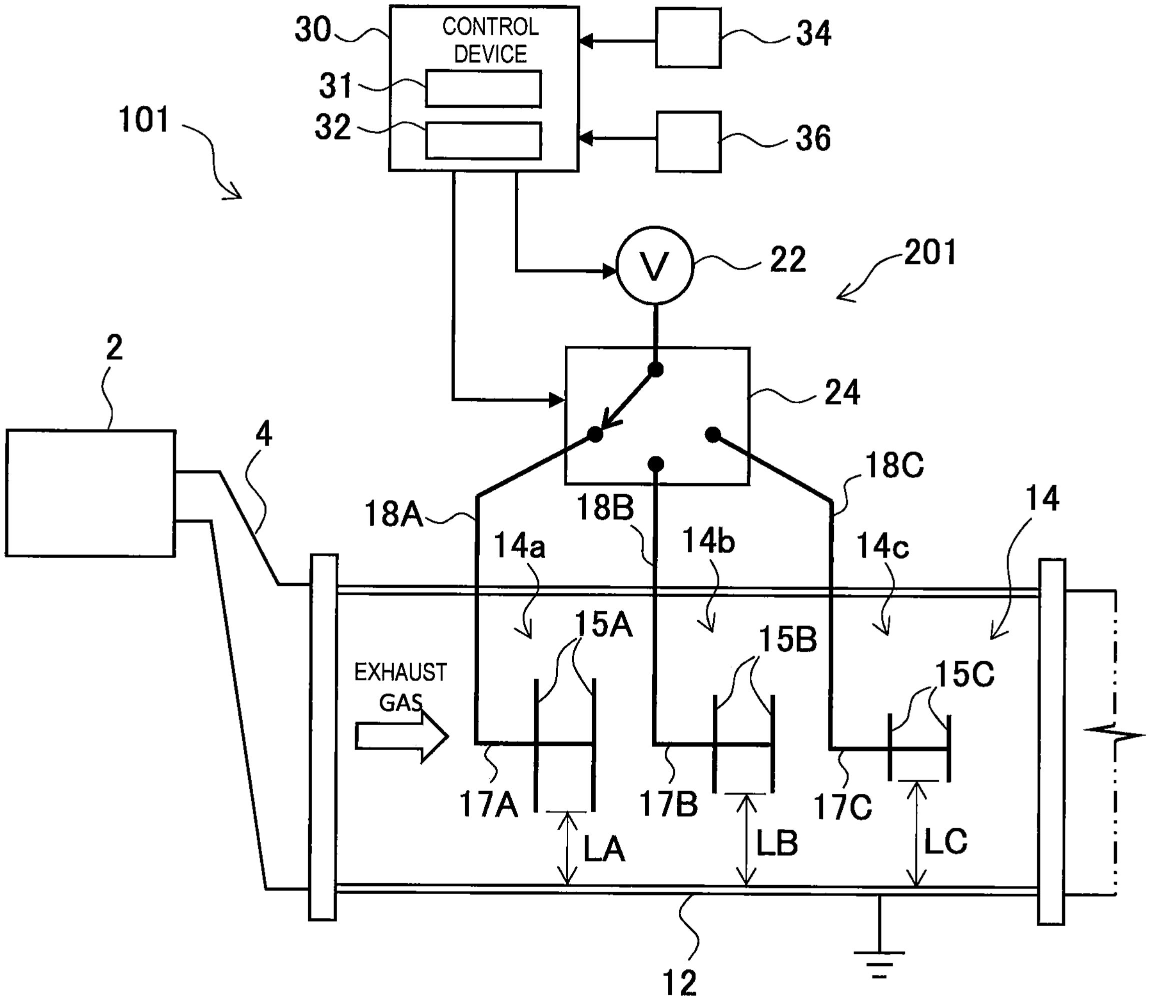
FIG. 4 is a view illustrating a configuration of a modification of the electric dust collecting apparatus according to the first embodiment of the present disclosure.

FIG. 4 is a view illustrating a configuration of a modification of the electric dust collecting apparatus according to the first embodiment. In this modification, a plurality of discharge electrodes 15A, a plurality of discharge electrodes 15B, and a plurality of discharge electrodes 15C are provided (in FIG. 4, two each are provided). Specifically, two discharge electrodes 15A, 15A having the same electrode-to-electrode distance are mounted side by side on the axis part 17A so that voltage is applied to the two discharge electrodes 15A, 15A simultaneously from the common power supply 22. Thereby, one discharge region 14*a* is formed by two discharge electrodes 15A, 15A.

In other words, in this modification, the discharge region 14*a* includes two discharge electrodes 15A, 15A having the same electrode-to-electrode distance. Similarly, the discharge region 14*b* includes two discharge electrodes 15B, 15B having the same electrode-to-electrode distance, and the discharge region 14*c* includes two discharge electrodes 15C, 15C having the same electrode-to-electrode distance. However, each discharge region may include more discharge electrodes, or the number of discharge electrodes may differ between discharge regions.

The configuration of the modification of the first embodiment, that is, the configuration including a plurality of discharge electrodes having the same electrode-to-electrode distance in one discharge region can be applied to the electric dust collecting apparatuses of other embodiments described below.

2. Second Embodiment

Next, the second embodiment of the present disclosure will be described. The present embodiment is characterized by the electrode switching control executed by the voltage applying device. The basic configuration of the electric dust collecting apparatus according to the present embodiment is in common with the electric dust collecting apparatus according to the first embodiment. Therefore, in the following description, when referring to the configuration of the electric dust collecting apparatus, please refer to FIG. 1 unless otherwise stated.

2-1. Overview of Electric Dust Collecting Apparatus of Second Embodiment

Figure 5:
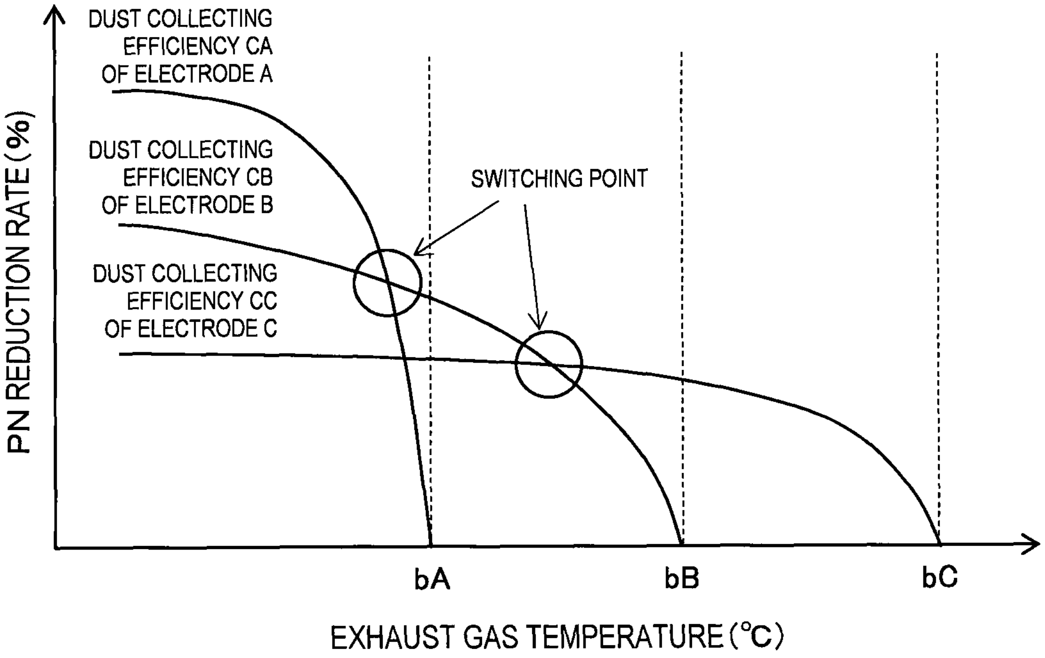
FIG. 5 is a diagram showing an overview of electrode switching control according to a second embodiment of the present disclosure.

FIG. 5 is a diagram showing an overview of the electrode switching control according to the present embodiment. In FIG. 5, the relation between a PN reduction rate and the exhaust gas temperature is shown for each of the electrodes A, B, C. Note that PN means the number concentration of PM in exhaust gas. Here, the dust collecting efficiency is defined as the PN reduction rate. Further, the dust collecting efficiency of the electrode A is referred as CA, the dust collecting efficiency of the electrode B is referred as CB, and the dust collecting efficiency of the electrode C is referred as CC.

If the applied voltage is the same, the dust collecting efficiency CA of the electrode A that has the shortest electrode-to-electrode distance is the highest, and the dust collecting efficiency CC of the electrode C that has the longest electrode-to-electrode distance is the lowest. However, when compared under the same exhaust gas temperature, the maximum applied voltage becomes the highest in the electrode C and becomes the lowest in the electrode A as shown in FIG. 2. As a result, as shown in FIG. 5, the electrode in which the highest dust collecting efficiency can be obtained changes depending on the temperature region. Specifically, in the low-temperature region, the dust collecting efficiency CA of the electrode A is the highest, in the middle-temperature region, the dust collecting efficiency CB of the electrode B is the highest, and in the high-temperature region, the dust collecting efficiency CC of the electrode C is the highest. Note that characteristics shown in FIG. 5 are merely one example. However, the upper limit temperature of the low-temperature region where the dust collecting efficiency CA becomes the highest among the dust collecting efficiency CA, CB, CC is necessarily lower than the dielectric breakdown temperature bA of the electrode A. Similarly, the upper limit temperature of the middle-temperature region where the dust collecting efficiency CB becomes the highest among the dust collecting efficiency CA, CB, CC is necessarily lower than the dielectric breakdown temperature bB of the electrode B. Also, the upper limit temperature of the high-temperature region where the dust collecting efficiency CC becomes the highest among the dust collecting efficiency CA, CB, CC is equal to the dielectric breakdown temperature bC of the electrode C.

The relation between the exhaust gas temperature and the dust collecting efficiency in each electrode shown in FIG. 5 is mapped together with the relation between the exhaust gas temperature and the maximum applied voltage in each electrode shown in FIG. 2, and is stored in the memory 32 of the control device 30. In the electrode switching control according to the present embodiment, switching of the electrode is performed to obtain the highest dust collecting efficiency, by using a map showing the relation between the exhaust gas temperature, the maximum applied voltage and the dust collecting efficiency in each electrode.

Figure 6:
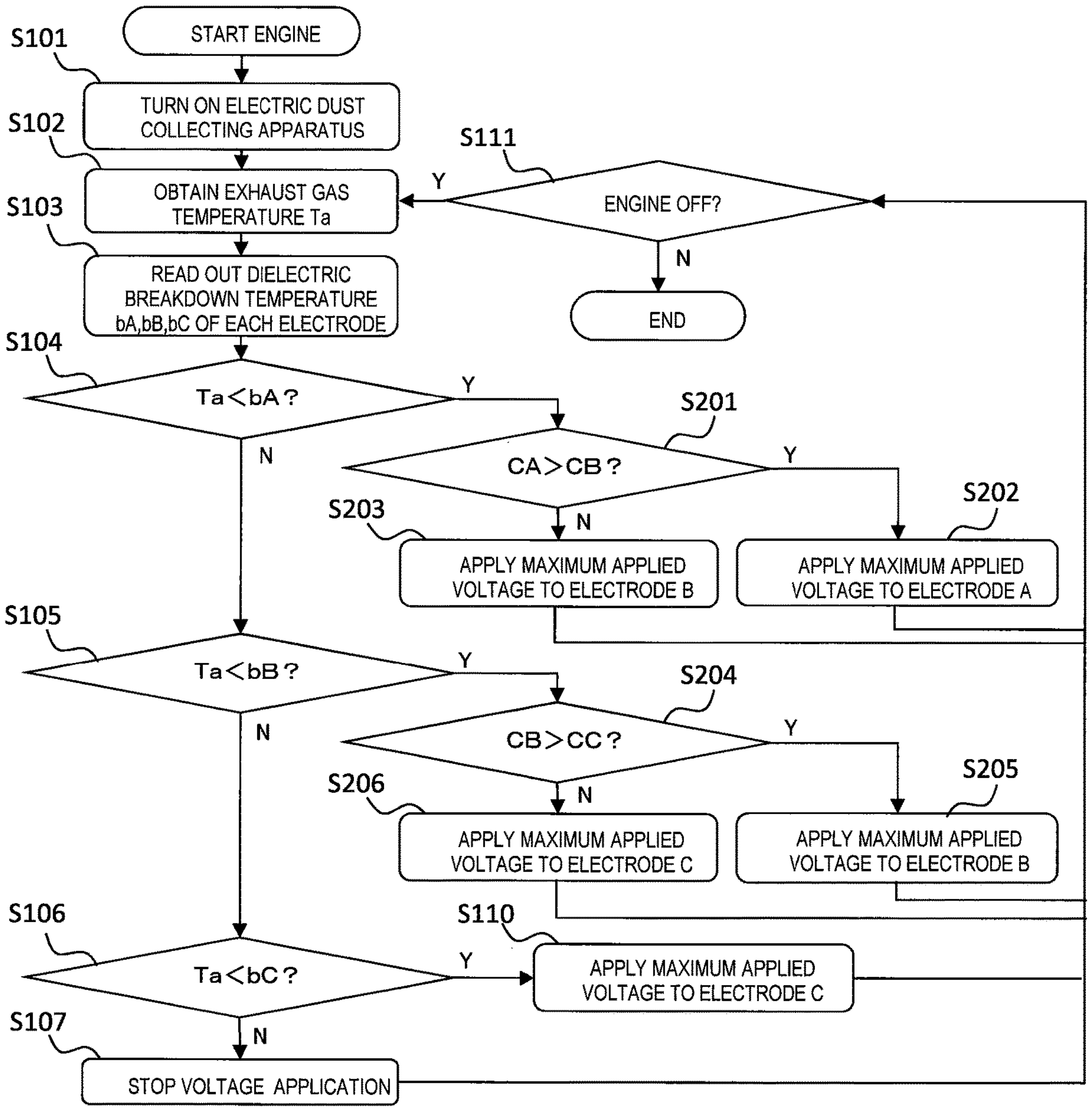
FIG. 6 is a flowchart illustrating control flows of electrode switching control and applied voltage control according to the second embodiment of the present disclosure.

2-2. Detail of Electrode Switching Control and Applied Voltage Control of Second Embodiment FIG. 6 is a flowchart illustrating control flows of the electrode switching control and applied voltage control according to the second embodiment. In this flowchart, the processing given the same step number as the processing in the flowchart of FIG. 1 means the processing having the same content as the processing in the flowchart of FIG. 1. Therefore, the description about such the processing is omitted or simplified.

In the present embodiment, when it is determined that the exhaust gas temperature Ta is lower than the dielectric breakdown temperature bA in step S104, the determination of step S201 is performed. In step S201, the dust collecting efficiency CA of the electrode A and the dust collecting efficiency CB of the electrode B are read out from the map according to the exhaust gas temperature Ta, and are compared. As a result of the comparison, when the dust collecting efficiency CA of the electrode A is higher than the dust collecting efficiency CB of the electrode B, the processing of step S202 is selected. In step S202, the selector switch 24 is controlled to connect the common power supply 22 and the electrode A (discharge electrode 15A), and the common power supply 22 is controlled to apply the maximum applied voltage to the electrode A.

As a result of the comparison in step S201, when the dust collecting efficiency CB of the electrode B is equal to or higher than the dust collecting efficiency CA of the electrode A, the processing of step S203 is selected. In step S203, the selector switch 24 is controlled to connect the common power supply 22 and the electrode B (discharge electrode 15B), and the common power supply 22 is controlled to apply the maximum applied voltage to the electrode B.

When the exhaust gas temperature Ta rises up to the dielectric breakdown temperature bA or higher, the exhaust gas temperature Ta is compared with the dielectric breakdown temperature bB of the electrode B, in step S105. As a result of the comparison, when it is determined that the exhaust gas temperature Ta is lower than the dielectric breakdown temperature bB, the determination of step S204 is performed. In step S204, the dust collecting efficiency CB of the electrode B and the dust collecting efficiency CC of the electrode C are read out from the map according to the exhaust gas temperature Ta, and are compared. As a result of the comparison, when the dust collecting efficiency CB of the electrode B is higher than the dust collecting efficiency CC of the electrode C, the processing of step S205 is selected. In step S205, the selector switch 24 is controlled to connect the common power supply 22 and the electrode B (discharge electrode 15B), and the common power supply 22 is controlled to apply the maximum applied voltage to the electrode B.

As a result of the comparison in step S204, when the dust collecting efficiency CC of the electrode C is equal to or higher than the dust collecting efficiency CB of the electrode B, the processing of step S206 is selected. In step S206, the selector switch 24 is controlled to connect the common power supply 22 and the electrode C (discharge electrode 15C), and the common power supply 22 is controlled to apply the maximum applied voltage to the electrode C.

When the exhaust gas temperature Ta rises up to the dielectric breakdown temperature bB or higher, the exhaust gas temperature Ta is compared with the dielectric breakdown temperature bC of the electrode C, in step S106. As a result of the comparison, when it is determined that the exhaust gas temperature Ta is lower than the dielectric breakdown temperature bC, the processing of step S110 is selected to continue to apply the maximum applied voltage to the electrode C.

By executing the electrode switching control and applied voltage control according to the above control flows, in the low-temperature region where the exhaust gas temperature is low, PM is collected with high collection efficiency in the discharge region having short electrode-to-electrode distance. In the high-temperature region where the exhaust gas temperature is high, collecting PM is continued in the discharge region having long electrode-to-electrode distance.

3. Third Embodiment

Next, the third embodiment of the present disclosure will be described. The present embodiment is characterized by the configuration of the electric dust collecting apparatus and the electrode switching control and applied voltage control executed by the voltage applying device.

Figure 7:
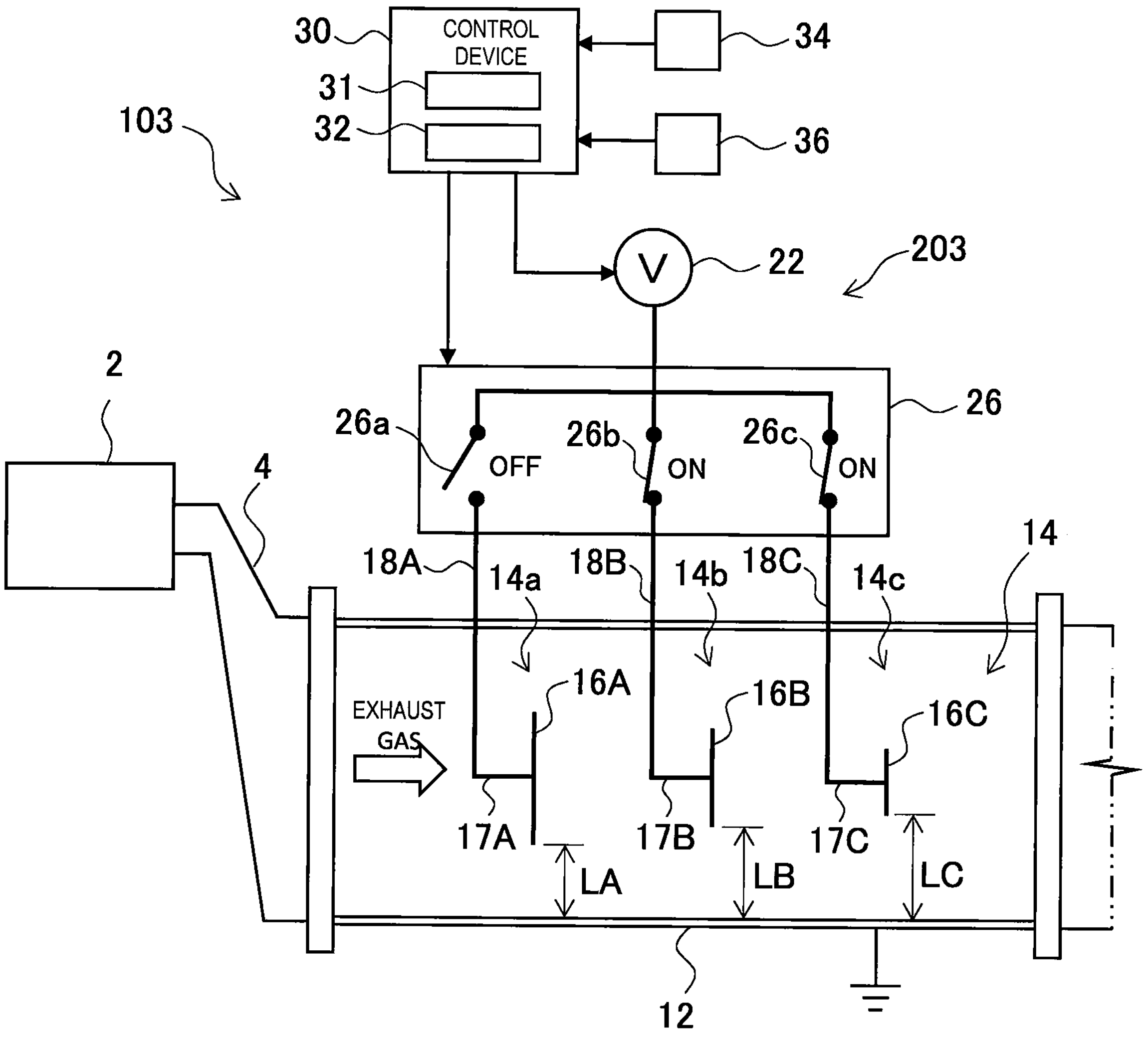
FIG. 7 is a view illustrating a configuration of an electric dust collecting apparatus according to a third embodiment of the present disclosure.

3-1. Configuration of Electric Dust Collecting Apparatus of Third Embodiment FIG. 7 is a view illustrating the configuration of the electric dust collecting apparatus according to the present embodiment. The electric dust collecting apparatus 103 according to the present embodiment is different from the first embodiment in the configuration of the voltage applying device. The voltage applying device 203 according to the present embodiment includes an on-off switch 26 in place of the selector switch 24 (see FIG. 1) included in the voltage applying device 201 of the first embodiment.

The on-off switch 26 consist of three switches 26*a*, 26*b*, 26*c*. The input terminal of each of the switches 26*a*, 26*b*, 26*c* is connected to the common power supply 22. The output terminal of the switch a is connected to the discharge electrode 15A via the conductor 18A and the axis part 17A. The output terminal of the switch 26*b* is connected to the discharge electrode 15B via the conductor 18B and the axis part 17B. The output terminal of the switch 26*c* is connected to the discharge electrode 15C via the conductor 18C and an axis part 17C.

According to this configuration, the voltage applying device 203 can apply voltage selectively from the common power supply 22 to each of the discharge electrodes 15A, 15B, 15C by on/off switching of each switch 26*a*, 26*b*, 26*c* of the on-off switch 26. Specifically, in the voltage applying device 201 according to the first embodiment (see FIG. 1), voltage can be applied to only any one of the discharge electrodes 15A, 15B, 15C. However, in the voltage applying device 203 according to the present embodiment, voltage can be applied from the common power supply 22 to any one or more discharge electrodes simultaneously by operating the switches 26*a*, 26*b*, 26*c* individually. Note that on/off switching of each switch 26*a*, 26*b*, 26*c* is controlled by the control device 30.

3-2. Overview of Electrode Switching Control and Applied Voltage Control of Third Embodiment According to the configuration of the electric dust collecting apparatus 103 according to the present embodiment, voltage can be applied to a plurality of discharge electrodes simultaneously. To make the dust collecting efficiency of whole the system as high as possible, it is preferable that the number of discharge electrodes to which voltage is applied is as large as possible. However, since the common power supply is used, when the dielectric breakdown is occurred at any one of discharge electrodes, applying voltage to all other discharge electrodes becomes impossible due to a short circuit caused by the dielectric breakdown. The electrode switching control and applied voltage control of the present embodiment is designed to be able to apply voltage to as many discharge electrodes as possible without causing the dielectric breakdown.

Figure 8:
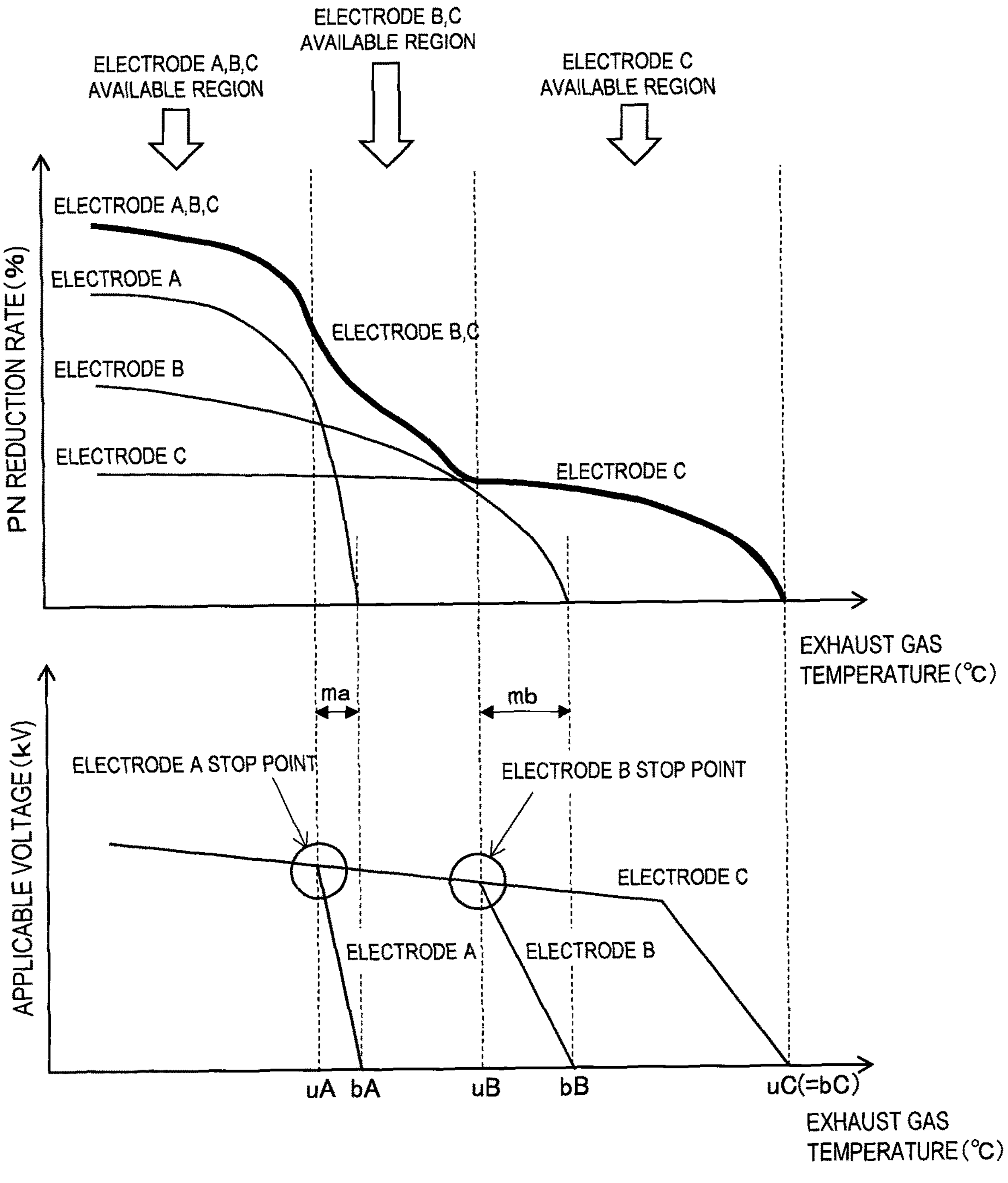
FIG. 8 is a diagram showing an overview of electrode switching control and applied voltage control according to the third embodiment of the present disclosure.

FIG. 8 is a diagram showing the overview of the electrode switching control and applied voltage control according to the present embodiment. The lower part of FIG. 8 shows the relation between the applicable voltage and the exhaust gas temperature in each of the electrodes A, B, C.

As shown earlier in FIG. 2, the maximum applied voltage differs between the electrodes A, B, C. If the exhaust gas temperature is the same, higher voltage can be applied to the electrode having longer electrode-to-electrode distance. However, to prevent the dielectric breakdown, it is necessary to adjust the applied voltage to the applicable voltage of the electrode having the lowest applicable voltage among the electrode capable of voltage application, that is, the electrode having the shortest electrode-to-electrode distance. Also, if the dielectric breakdown is occurred at one electrode, applying voltage to all other electrodes becomes impossible. Therefore, when the exhaust gas temperature is likely to exceed the dielectric breakdown temperature of a certain electrode, it is necessary to turn off the connection between the certain electrode and the common power supply 22 by operating the on-off switch 26.

For this reason, in the present embodiment, in the temperature region where voltage can be applied to the electrode A, the maximum applied voltage of the electrode A is set as the applied voltage to the electrodes A, B, C. Then, when the exhaust gas temperature reaches the upper limit temperature uA set for the electrode A, the switch 26*a* of the on-off switch 26 is opened to turn off the connection between the electrode A and the common power supply 22. The upper limit temperature uA for the electrode A is set lower than the dielectric breakdown temperature bA by a predetermined margin ma. The margin ma is set so that the voltage application to the electrode A can be stopped before the applicable voltage of the electrode A starts to drop greatly.

After stopping the voltage application to the electrode A, the applicable voltage of the electrode B is set as the applied voltage to the electrodes B, C. Note that the applicable voltage of the electrode B does not necessarily mean the maximum applied voltage of the electrode B. In FIG. 8, voltage lower than the maximum applied voltage of the electrode B is applied to the electrode B, C in order to achieve continuity in the applied voltage before and after stopping the voltage application to the electrode A. Then, when the exhaust gas temperature reaches the upper limit temperature uB set for the electrode B, the switch 26*b* of the on-off switch 26 is opened to turn off the connection between the electrode B and the common power supply 22. The upper limit temperature uB for the electrode B is set lower than the dielectric breakdown temperature bB by a predetermined margin mb. The margin mb is set so that the voltage application to the electrode B can be stopped before the applicable voltage of the electrode B starts to drop greatly.

After stopping the voltage application to the electrode B, the applicable voltage of the electrode C is set as the applied voltage to the electrode C as it is. Note that the applicable voltage of the electrode C does not necessarily mean the maximum applied voltage of the electrode C. In FIG. 8, voltage lower than the maximum applied voltage of the electrode C is applied to the electrode C in order to achieve continuity in the applied voltage before and after stopping the voltage application to the electrode B. The voltage application for the electrode C continues until the exhaust gas temperature reaches the upper limit temperature uC set for the electrode C. Here the upper limit temperature uC for the electrode C is set equal to the dielectric breakdown temperature bC.

In the upper part of FIG. 8, the relation between the PN reduction rate and the exhaust gas temperature is shown by a thin line for each of the electrodes A, B, C. The relation between the PN reduction rate and the exhaust gas temperature in the entire system, which is realized by performing the electrode switching control and applied voltage control of the present embodiment, is shown by a bold line. According to the present embodiment, it is possible to further improve the dust collecting performance in the low-temperature region while enlarging the temperature region capable of collecting PM to the high-temperature region.

Figure 9:
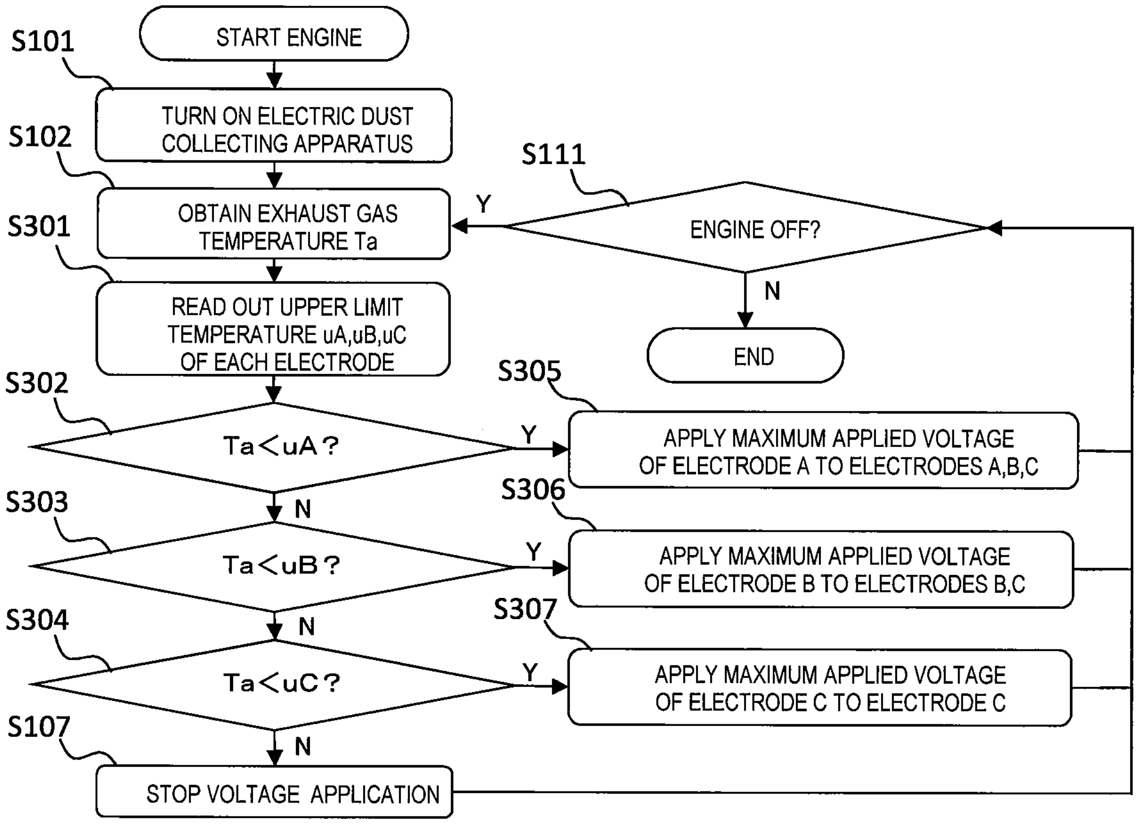
FIG. 9 is a flowchart illustrating control flows of electrode switching control and applied voltage control according to the third embodiment of the present disclosure.

3-3. Detail of Electrode Switching Control and Applied Voltage Control of Third Embodiment FIG. 9 is a flowchart illustrating control flows of the electrode switching control and applied voltage control according to the third embodiment. In this flowchart, the processing given the same step number as the processing in the flowchart of FIG. 1 means the processing having the same content as the processing in the flowchart of FIG. 1. Therefore, the description about such the processing is omitted or simplified.

In this embodiment, after the exhaust gas temperature Ta is obtained in step S102, the processing of step S301 is executed. In step S301, the upper limit temperatures uA, uB, uC of the electrodes A, B, C are read out from the memory 32. The upper limit temperatures uA, uB, uC are set based on the dielectric breakdown temperatures bA, bB, bC that are unique values of the system.

Next, in step S302, the exhaust gas temperature Ta obtained in step S102 is compared with the upper limit temperature uA of the electrode A that has the shortest electrode-to-electrode distance. When the exhaust gas temperature Ta is lower than the upper limit temperature uA, the processing of step S305 is selected. In step S305, the on-off switch 26 is controlled to connect the common power supply 22 and all the electrodes A, B, C (discharge electrodes 15A, 15B, 15C), and the common power supply 22 is controlled to apply the maximum applied voltage of the electrode A to these electrodes A, B, C. Thereby, in the low-temperature region where the exhaust gas temperature is low, corona discharge occurs at all of the electrodes A, B, C, and PM charged thereby is collected on the ground electrode.

When the exhaust gas temperature Ta rises up to the upper limit temperature uA or higher, in step S303, the exhaust gas temperature Ta obtained in step S102 is compared with the upper limit temperature uB of the electrode B that has the next shortest electrode-to-electrode distance. When the exhaust gas temperature Ta is lower than the upper limit temperature uB, the processing of step S306 is selected. In step S306, the on-off switch 26 is controlled to connect the common power supply 22 and the electrodes B, C (discharge electrodes 15B, 15C), and the common power supply 22 is controlled to apply the maximum applied voltage of the electrode B to these electrodes B, C. Thereby, in the low-temperature region where the exhaust gas temperature is low, corona discharge continues to occur at the electrodes B, C, and PM charged thereby is collected on the ground electrode.

When the exhaust gas temperature Ta rises up to the upper limit temperature uB or higher, in step S304, the exhaust gas temperature Ta obtained in step S102 is compared with the upper limit temperature uC of the electrode C that has the longest electrode-to-electrode distance. When the exhaust gas temperature Ta is lower than the upper limit temperature uC, the processing of step S307 is selected. In step S307, the on-off switch 26 is controlled to connect the common power supply 22 and only the electrode C (discharge electrode 15C), and the common power supply 22 is controlled to apply the maximum applied voltage of the electrode C to the electrode C. Thereby, also in the high-temperature region where the exhaust gas temperature is high, corona discharge continues to occur at the electrode C, and PM charged thereby is collected on the ground electrode. When the exhaust gas temperature Ta rises up to the upper limit temperature uC or higher, in step S107, the common power supply 22 is controlled to stop applying voltage.

By executing the electrode switching control and applied voltage control according to the above control flows, collecting PM is continued up to the upper limit temperature at each electrode. Therefore, high dust collecting performance is achieved as a whole, especially, the dust collecting performance in the low-temperature region is improved further.

4. Fourth Embodiment

Next, the fourth embodiment of the present disclosure will be described. The present embodiment is characterized by the configuration of the electric dust collecting apparatus and the electrode switching control and applied voltage control executed by the voltage applying device.

4-1. Configuration of Electric Dust Collecting Apparatus of Fourth Embodiment

Figure 10:
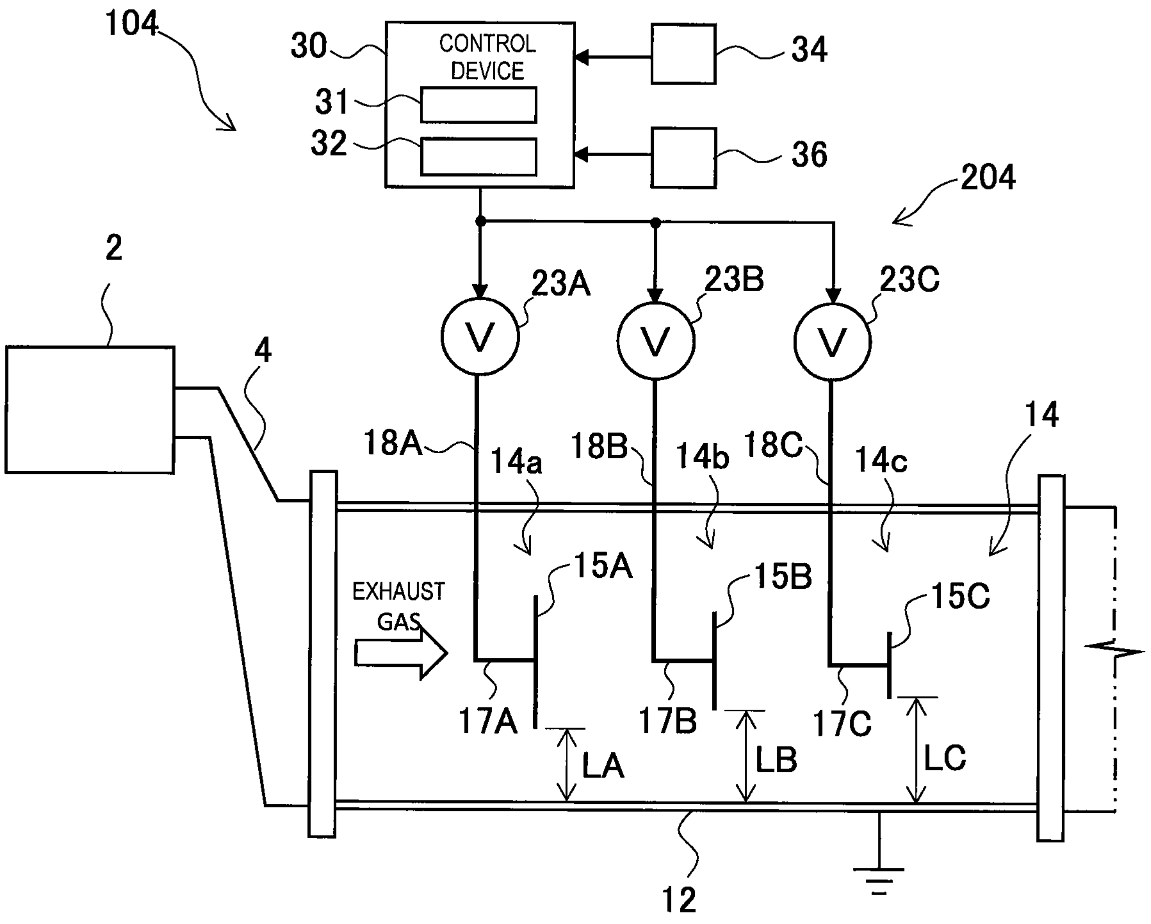
FIG. 10 is a view illustrating a configuration of an electric dust collecting apparatus according to a fourth embodiment of the present disclosure.

FIG. 10 is a view illustrating the configuration of the electric dust collecting apparatus according to the present embodiment. The electric dust collecting apparatus 104 according to the present embodiment is different from the first embodiment in the configuration of the voltage applying device. The voltage applying device 204 according to the present embodiment includes individual power supplies 23A, 23B, 23C in place of the common power supply 22 (see FIG. 1) included in the voltage applying device 201 of the first embodiment. The individual power supplies 23A, 23B, 23C are prepared for respective discharge electrodes. The individual power supply 23A is connected to the discharge electrode 15A via the conductor 18A and the axis part 17A. The individual power supply 23B is connected to the discharge electrode 15B via the conductor 18B and the axis part 17B. The individual power supply 23C is connected to the discharge electrode 15C via the conductor 18C and an axis part 17C.

According to this configuration, in the voltage applying device 204 according to the present embodiment, the applied voltage is controlled for each discharge electrode by operating individually the individual power supplies 23A, 23B, 23C provided for respective discharge electrodes. Note that each of the individual power supplies 23A, 23B, 23C is controlled by the control device 30.

4-2. Overview of Electrode Switching Control and Applied Voltage Control of Fourth Embodiment According to the configuration of the electric dust collecting apparatus 104 according to the present embodiment, voltage can be applied to a plurality of discharge electrodes simultaneously and individually. To make the dust collecting efficiency of whole the system as high as possible, it is preferable that the number of discharge electrodes to which voltage is applied is as large as possible and the applied voltage is as high as possible within the maximum applied voltage. Since the power supply is independent for each discharge electrode in the present embodiment, even if the dielectric breakdown is occurred at any one of discharge electrodes, other discharge electrodes aren't affected by this. The electrode switching control and applied voltage control of the present embodiment is designed to be able to apply voltage as high as possible to as many discharge electrodes as possible without fearing the dielectric breakdown being caused.

Figure 11:
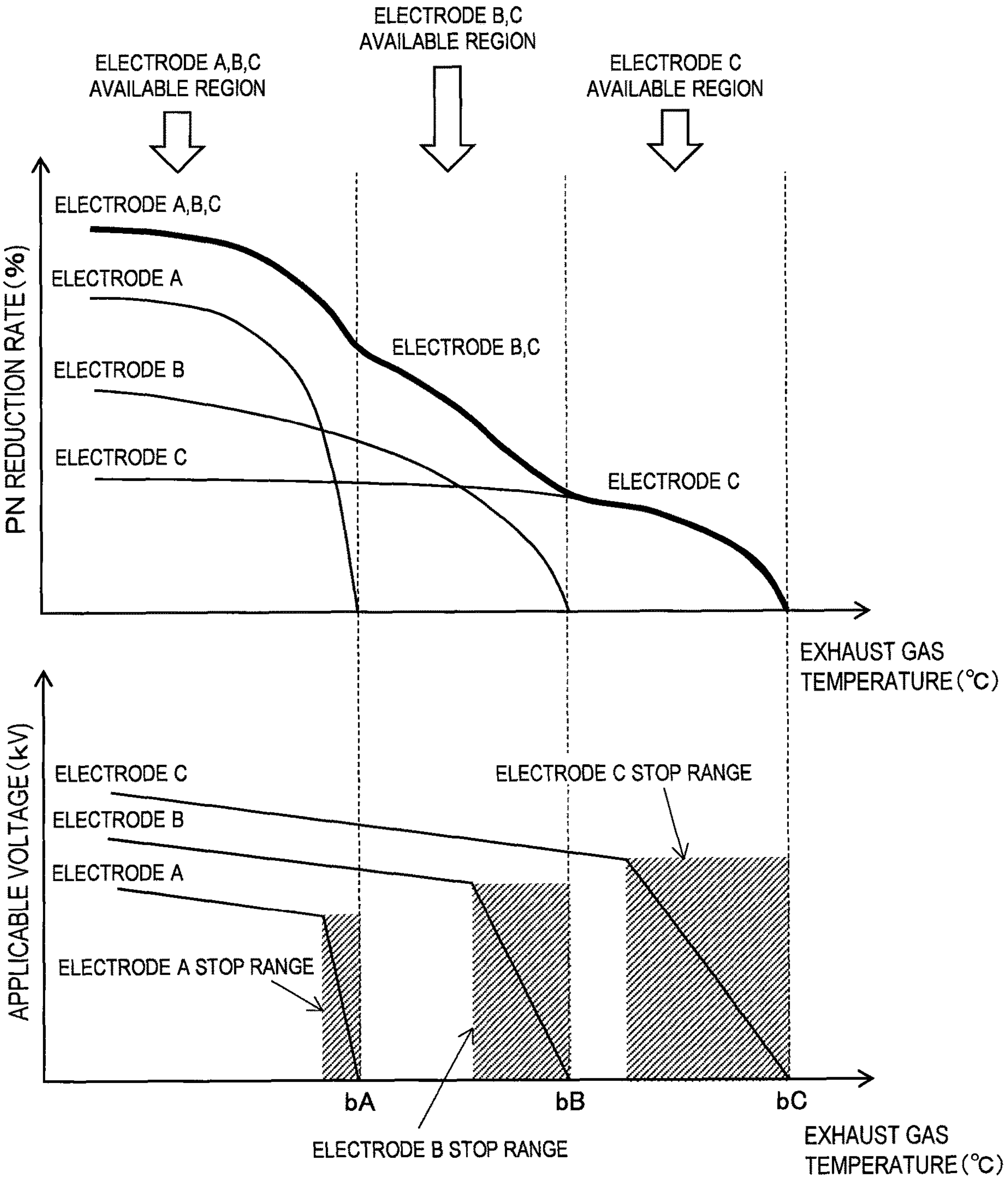
FIG. 11 is a diagram showing an overview of electrode switching control and applied voltage control according to the fourth embodiment of the present disclosure.

FIG. 11 is a diagram showing the overview of the electrode switching control and applied voltage control according to the present embodiment. The lower part of FIG. 11 shows the relation between the applicable voltage and the exhaust gas temperature in each of the electrodes A, B, C. According to the present embodiment, since the voltage applying device 204 includes the individual power supplies 23A, 23B, 23C, the maximum applied voltage is applied to each of the electrodes A, B, C until the exhaust gas temperature exceeds the dielectric breakdown temperature.

When the exhaust gas temperature exceeds the dielectric breakdown temperature bA of the electrode A, PM collecting effect by the electrode A is lost due to the dielectric breakdown, but there is no inconvenience in continuously applying the voltage as it is. However, since this causes waste of power, when the exhaust gas temperature exceeds the dielectric breakdown temperature bA, the voltage application from the individual power supply 23A to the electrode A is stopped. Alternatively, since PM collecting effect decreases when the applied voltage decreases, the voltage application from the individual power supply 23A to the electrode A may be stopped when voltage starts to decrease greatly. This is applied to the voltage application from the individual power supply 23B to the electrode B, and also is applied to the voltage application from the individual power supply 23C to the electrode C.

In the upper part of FIG. 11, the relation between the PN reduction rate and the exhaust gas temperature is shown by a thin line for each of the electrodes A, B, C. The relation between the PN reduction rate and the exhaust gas temperature in the entire system, which is realized by performing the electrode switching control and applied voltage control of the present embodiment, is shown by a bold line. According to the present embodiment, it is possible to further improve the dust collecting performance in the low-temperature region and the middle-temperature region while enlarging the temperature region capable of collecting PM to the high-temperature region.

Figure 12:
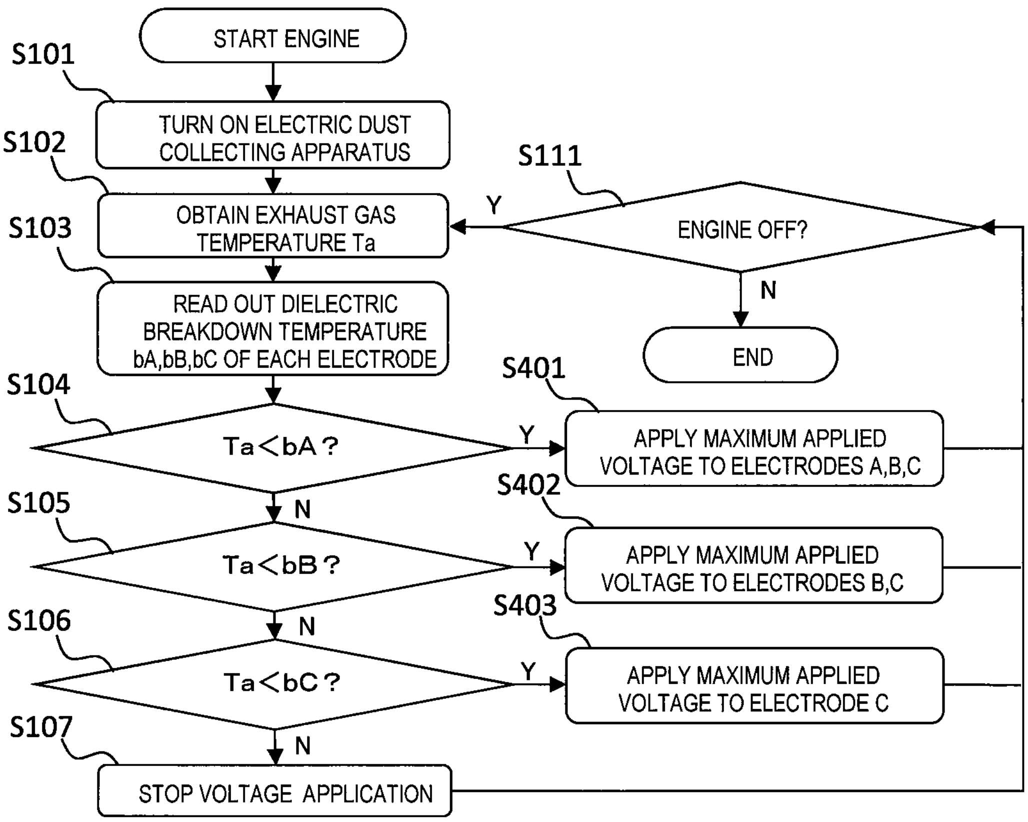
FIG. 12 is a flowchart illustrating control flows of electrode switching control and applied voltage control according to the fourth embodiment of the present disclosure.

4-3. Detail of Electrode Switching Control and Applied Voltage Control of Fourth Embodiment FIG. 12 is a flowchart illustrating control flows of the electrode switching control and applied voltage control according to the fourth embodiment. In this flowchart, the processing given the same step number as the processing in the flowchart of FIG. 1 means the processing having the same content as the processing in the flowchart of FIG. 1. Therefore, the description about such the processing is omitted or simplified.

In this embodiment, when the exhaust gas temperature Ta is lower than the dielectric breakdown temperature bA that is the upper limit temperature of the electrode A, the processing of step S401 is selected. In step S401, the individual power supplies 23A, 23B, 23C are controlled to apply the maximum applied voltages to the respective electrodes A, B, C (discharge electrodes 15A, 15B, 15C).

When the exhaust gas temperature Ta rises up to the dielectric breakdown temperature bA or higher, in step S105, the exhaust gas temperature Ta is compared with the dielectric breakdown temperature bB of the electrode B. As a result of the comparison, when it is determined that the exhaust gas temperature Ta is lower than the dielectric breakdown temperature bB, the processing of step S402 is selected. In step S402, the voltage application from the individual power supply 23A to the electrode A is stopped, and the individual power supplies 23B, 23C are controlled to apply the maximum applied voltages to the respective electrodes B, C.

When the exhaust gas temperature Ta rises up to the dielectric breakdown temperature bB or higher, in step S106, the exhaust gas temperature Ta is compared with the dielectric breakdown temperature bC of the electrode C. As a result of the comparison, when it is determined that the exhaust gas temperature Ta is lower than the dielectric breakdown temperature bC, the processing of step S403 is selected. In step S403, the voltage application from the individual power supply 23B to the electrode B is stopped, and the individual power supply 23C is controlled to apply the maximum applied voltage to the electrode C.

By executing the electrode switching control and applied voltage control according to the above control flows, collecting PM is continued up to the dielectric breakdown temperature at each electrode, and moreover, the maximum applied voltage is applied during the time. Therefore, high dust collecting performance is achieved as a whole, especially, the dust collecting performance in the low-temperature region and the middle-temperature region is improved further.

5. Fifth Embodiment

Next, the fifth embodiment of the present disclosure will be described. The present embodiment is characterized in that change of the electrode-to-electrode distance due to PM deposition is considered in the electrode switching control and applied voltage control by the voltage applying device. Note that the configuration of the electric dust collecting apparatus according to the present embodiment is for convenience sake in common with the electric dust collecting apparatus according to the first embodiment.

Figure 13:
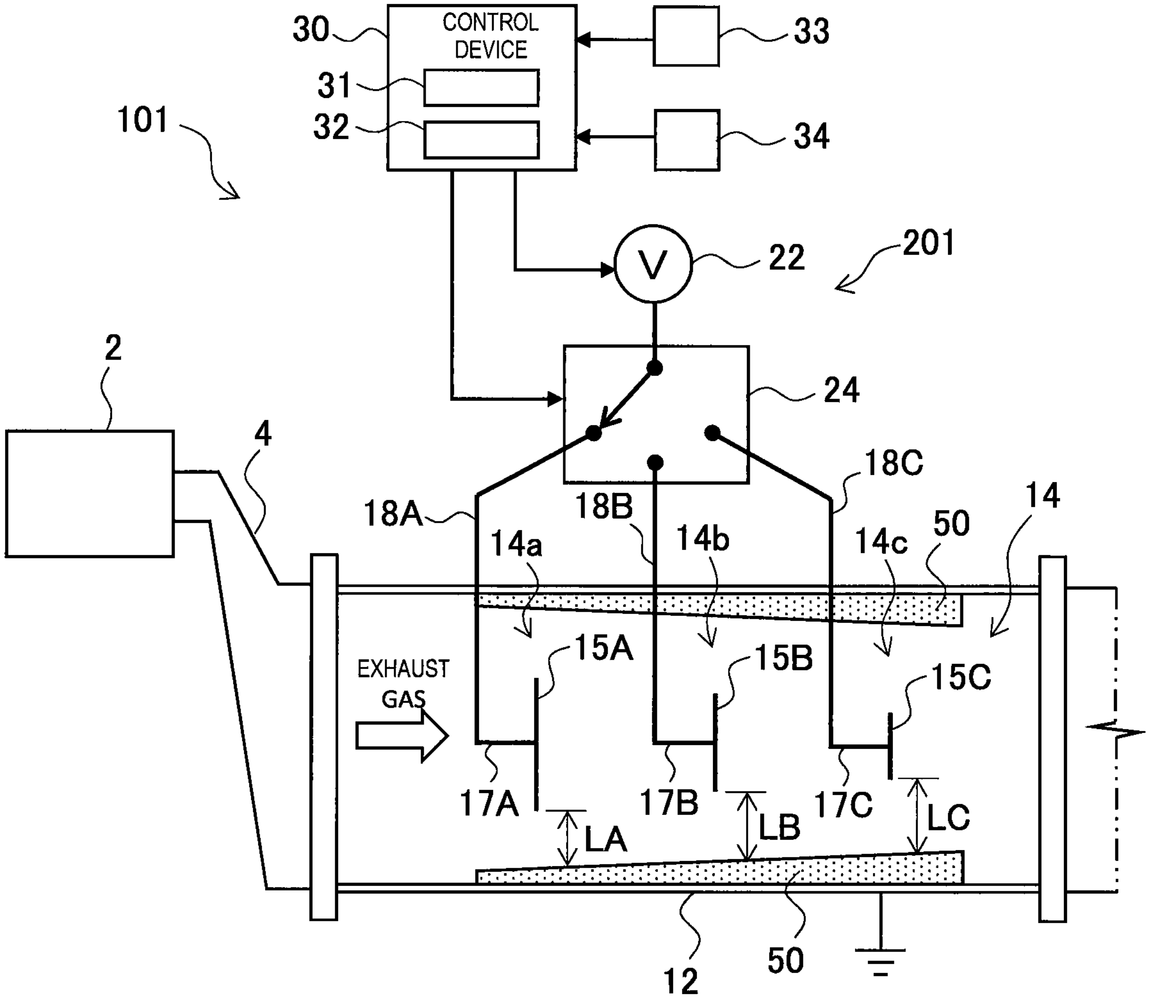
FIG. 13 is a view showing a state in which an electrode-to-electrode distance changes due to PM deposition in the electric dust collecting apparatus having the configuration shown in FIG. 1.

5-1. Overview of Electrode Switching Control and Applied Voltage Control of Fifth Embodiment FIG. 13 is a view showing a state in which the electrode-to-electrode distance changes due to the PM deposition in the electric dust collecting apparatus 101 according to the first embodiment. By continuing the operation of the electric dust collecting apparatus 101, a PM deposition layer 50 is formed on the inner wall surface of the housing 12 as the ground electrode. Also, PM adheres to the tip of discharge electrode 15A, 15B, 15C. As a result, the electrode-to-electrode distances LA, LB, LC become substantially shorter than the respective original distances. When the electrode-to-electrode distances LA, LB, LC become short, there occurs a deviation in the maximum applied voltage for the exhaust gas temperature, and there occurs a deviation in the dielectric breakdown temperature, which is a unique value of the system. Specifically, the dielectric breakdown may occur at the applied voltage that is not sufficient to cause it inherently, and may occur at the exhaust gas temperature that is not sufficient to cause it inherently.

Therefore, in the present embodiment, it is performed calculating an estimated deposit amount of PM, correcting the maximum applied voltages with respect to the respective discharge electrodes 15A, 15B, 15C based on the estimated deposit amount, and correcting the dielectric breakdown temperatures bA, bB, bC of the discharge electrodes 15A, 15B, 15C based on the estimated deposit amount. Specifically, first, it is performed calculating the estimated deposit amount of PM for each discharge electrode, and correcting the electrode-to-electrode distances LA, LB, LC. Then, it is performed correcting the maximum applied voltages with respect to the discharge electrodes 15A, 15B, 15C based on the corrected electrode-to-electrode distances LA, LB, LC respectively, and correcting the dielectric breakdown temperatures bA, bB, bC of the discharge electrodes 15A, 15B, 15C based on the corrected electrode-to-electrode distances LA, LB, LC respectively.

Figure 14:
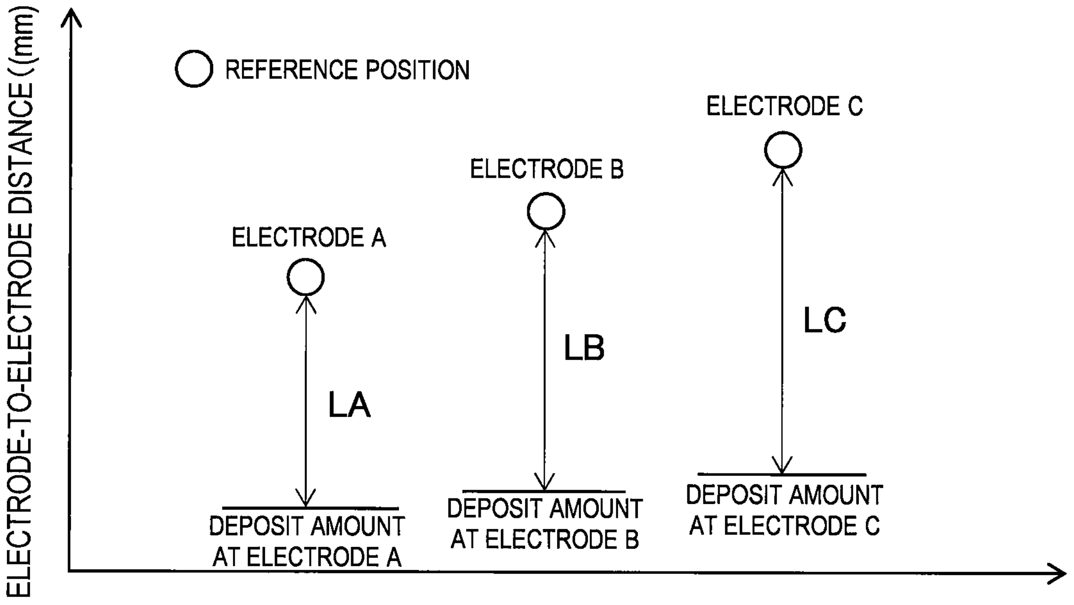
FIG. 14 is a diagram showing an image of electrode-to-electrode distance correction according to a fifth embodiment of the present disclosure.

FIG. 14 is a diagram showing an image of the electrode-to-electrode distance correction. Originally, the electrode-to-electrode distances LA, LB, LC are the distances from the respective electrodes A, B, C to the ground electrode. However, when there is the PM deposition, the electrode-to-electrode distances are corrected to be shorter by the deposit amount of PM. The deposit amount of PM is estimated for each electrode position (exactly for each discharge region). Note that the reference position in FIG. 14 means the tip position of the electrode closest to the ground electrode.

A PM deposit amount estimating model is used for calculating the estimated deposit amount of PM at each electrode position. The PM deposit amount estimating model is a physical model that estimates the distribution of the deposit amount in the exhaust flow direction, based on input information that is information on the condition of the exhaust gas to be processed, setting information that is information on the setting of the apparatus for collecting the exhaust gas, and history information that is information on the history of the combustion processing so far.

The PM deposit amount estimating model is expressed by, for example, formulas for calculating collection efficiency expressed by Formula 1 and Formula 2, formulas for calculating an increase amount of the deposit amount expressed by Formula 3, Formula 4 and Formula 5, and a formula for calculating the deposit amount expressed by Formula 6.

$$\eta_n = 1 - \exp^{k(-\omega e \cdot A_n / Ga)} \quad \text{Formula 1}$$

$$\omega e = ve = q \cdot E_n \cdot Cm / (3\pi \cdot \mu \cdot dp) \quad \text{Formula 2}$$

$$\Delta Gi_1 = Qs \cdot \eta_1 \cdot \Delta T \quad \text{Formula 3}$$

$$\Delta Gi_2 = Qs \cdot \eta_2 \cdot \Delta T - \Delta Gi_1 \quad \text{Formula 4}$$

$$\Delta Gi_3 = Qs \cdot \eta_3 \cdot \Delta T - \Delta Gi_1 - \Delta G_2 \quad \text{Formula 5}$$

$$G_n = \Sigma \Delta Gi_n \quad \text{Formula 6}$$

In Formula 1, the subscript "n" is the identification number indicating the electrode position. For example, the electrode position of the electrode A is "1", the electrode position of the electrode B is "2", and the electrode position of the electrode C is "3". "$\eta_n$" is the collection efficiency at the electrode position "n". "k" is the system specific correction factor, "An" is the effective substrate area ($m^2$) at the electrode position "n". "Ga" is the exhaust flow rate (g/s). "ωe" is the separation speed (m/s). The effective substrate area "An" is the area of the inner wall surface from the upstream end to the downstream end of the discharge region corresponding to the electrode position "n" (the discharge region 14*a*, for example, if the electrode position "1" is the electrode position of the electrode A). In Formula 2, "ve" is the phase speed with diffused charge. "q" is the charged amount of a particle (C). "$E_n$" is the electric field intensity (V/m) at the electrode position "n". "Cm" is the correction coefficient of Cunningham. "μ" is the viscosity of gas (Pa·s). "dp" is the particle diameter (m).

In Formula 3, Formula 4 and Formula 5, "Qs" is the PM amount per unit deposition time flowing into the electric dust collecting apparatus 101 together with the exhaust gas (hereinafter referred to as the instantaneous inflow PM amount), and "ΔT" is the unit deposition time. "$\Delta Gi_1$" is the increase amount of the deposit amount per unit deposition time in the discharge region 14*a* corresponding to the electrode position "1". "$\Delta Gi_2$" is the increase amount of the deposit amount per unit deposition time in the discharge region 14*b* corresponding to the electrode position "2". "$\Delta Gi_3$" is the increase amount of the deposit amount per unit deposition time in the discharge region 14*c* corresponding to the electrode position "3".

In Formula 6, "$G_n$" is the deposit amount of PM in the discharge region corresponding to the electrode position "n". "$\Delta Gi_n$" is the increase amount of the deposit amount per unit deposition time in the discharge region corresponding to the electrode position "n". By integrating the increase amount $\Delta Gi_n$ of the deposit amount per unit deposition time, the deposit amount $G_n$ at the present moment is calculated. Among the parameters used in these formulas, at least the exhaust gas flow rate Ga and the instantaneous inflow PM amount Qs are variables which vary depending on the operating conditions and are included in the above-mentioned input information. The instantaneous inflow PM amount Qs is calculated from, for example, engine speed, engine load, air-fuel ratio and the like. Also, at least the electric field intensity $E_n$ is a variable set by the electric dust collecting apparatus 101, and included in the above mentioned setting information. The value of the deposit amount $G_n$ in Formula 6 is initialized based on the history information on combustion processing (specifically, fuel cut operation).

The electrode-to-electrode distances LA, LB, LC are corrected based on the estimated deposit amounts of PM in the respective electrode positions calculated by the P M deposit amount estimating model. In the present embodiment, the relation between the electrode-to-electrode distance and the exhaust gas temperature is mapped and is stored in the memory 32 of the control device 30. Also, since the dielectric breakdown temperature varies if the electrode-to-electrode distance varies, in the present embodiment, the relation between the electrode-to-electrode distance and the dielectric breakdown temperature is mapped and is stored in the memory 32 of the control device 30.

When the electrode-to-electrode distance varies due to the PM deposition, the maximum applied voltage corresponding to the varied electrode-to-electrode distance and the exhaust gas temperature is obtained by referring to the maximum applied voltage map stored in the memory 32. In addition, when the electrode-to-electrode distance varies due to the PM deposition, the dielectric breakdown temperature corresponding to the varied electrode-to-electrode distance is obtained by referring to the dielectric breakdown temperature map stored in the memory 32.

Figure 15:
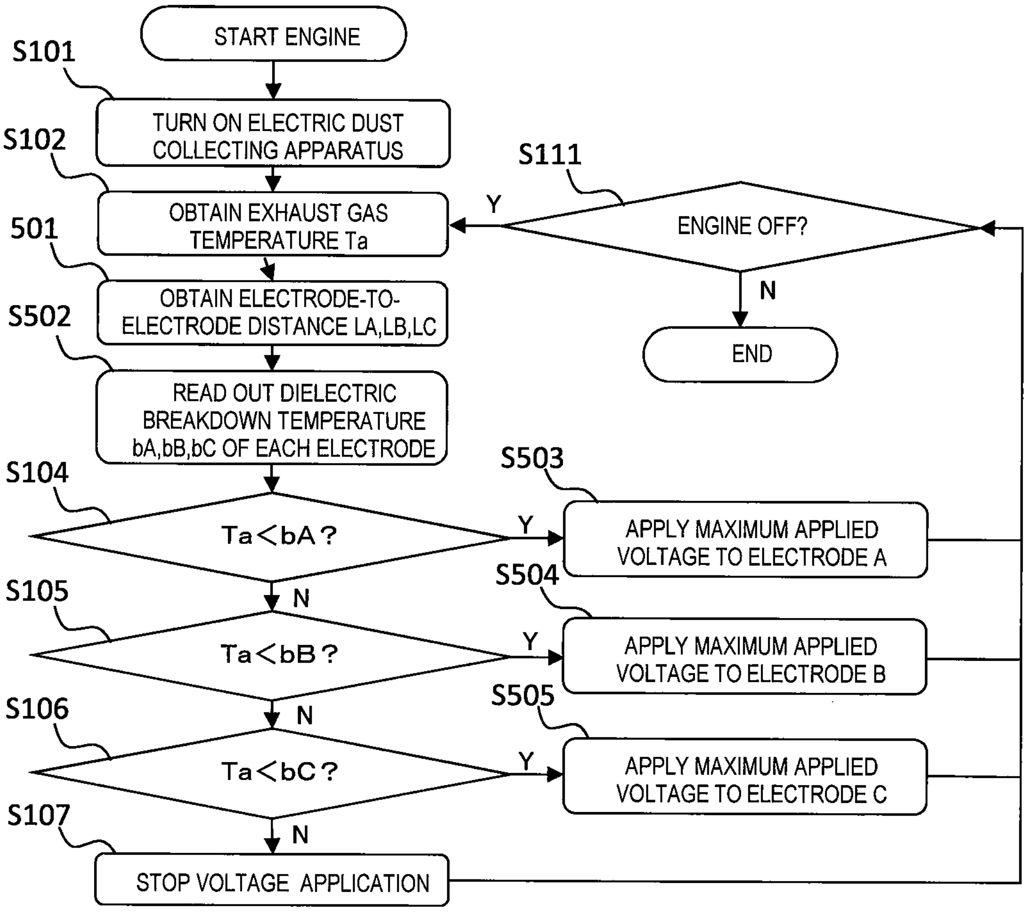
FIG. 15 is a flowchart illustrating control flows of electrode switching control and applied voltage control according to the fifth embodiment of the present disclosure.

5-2. Detail of Electrode Switching Control and Applied Voltage Control of Fifth Embodiment FIG. 15 is a flowchart illustrating control flows of the electrode switching control and applied voltage control according to the fifth embodiment. In this flowchart, the processing given the same step number as the processing in the flowchart of FIG. 1 means the processing having the same content as the processing in the flowchart of FIG. 1. Therefore, the description about such the processing is omitted or simplified.

In the present embodiment, after the exhaust gas temperature Ta is obtained in step S102, next, the processing of step S501 is executed. In step S501, the electrode-to-electrode distances LA, LB, LC at the respective electrodes A, B, C are obtained. The electrode-to-electrode distances LA, LB, LC obtained here are electrode-to-electrode distances corrected based on the estimated deposit amounts of PM at the respective electrode position.

After the processing of step S501, next, the processing of step S502 is executed. In step S502, the dielectric breakdown temperatures bA, bB, bC corresponding to the respective electrode-to-electrode distances LA, LB, LC obtained in step S501 are read out from the dielectric breakdown temperature map stored in the memory 32.

Next, in step S104, the exhaust gas temperature Ta obtained in step S102 is compared with the dielectric breakdown temperature bA read out from the dielectric breakdown temperature map in step S502. When the exhaust gas temperature Ta is lower than the dielectric breakdown temperature bA, the processing of step S503 is selected. In step S503, the maximum applied voltage of the electrode A corresponding to the electrode-to-electrode distance LA and the exhaust gas temperature is read out from the maximum applied voltage map stored in the memory 32. Then, the selector switch 24 is controlled to connect the common power supply 22 and the electrode A (discharge electrode 15A), and the common power supply 22 is controlled to apply the maximum applied voltage to the electrode A.

When the exhaust gas temperature Ta rises up to the dielectric breakdown temperature bA or higher, in step S105, the exhaust gas temperature Ta is compared with the dielectric breakdown temperature bB of the electrode B. As a result of the comparison, when it is determined that the exhaust gas temperature Ta is lower than the dielectric breakdown temperature bB, the processing of step S504 is selected. In step S504, the maximum applied voltage of the electrode B corresponding to the electrode-to-electrode distance LB and the exhaust gas temperature is read out from the maximum applied voltage map. Then, the selector switch 24 is controlled to connect the common power supply 22 and the electrode B (discharge electrode 15B), and the common power supply 22 is controlled to apply the maximum applied voltage to the electrode B.

When the exhaust gas temperature Ta rises up to the dielectric breakdown temperature bB or higher, in step S106, the exhaust gas temperature Ta is compared with the dielectric breakdown temperature bC of the electrode C. As a result of the comparison, when it is determined that the exhaust gas temperature Ta is lower than the dielectric breakdown temperature bC, the processing of step S505 is selected. In step S505, the maximum applied voltage of the electrode C corresponding to the electrode-to-electrode distance LC and the exhaust gas temperature is read out from the maximum applied voltage map. Then, the selector switch 24 is controlled to connect the common power supply 22 and the electrode C (discharge electrode 15C), and the common power supply 22 is controlled to apply the maximum applied voltage to the electrode C.

By executing the electrode switching control and applied voltage control according to the above control flows, the influence by the PM deposition is eliminated and the decrease of the dust collecting performance is suppressed.

6. Sixth Embodiment

Next, the sixth embodiment of the present disclosure will be described. The present embodiment is characterized by the configuration of the electric dust collecting apparatus.

Figure 16:
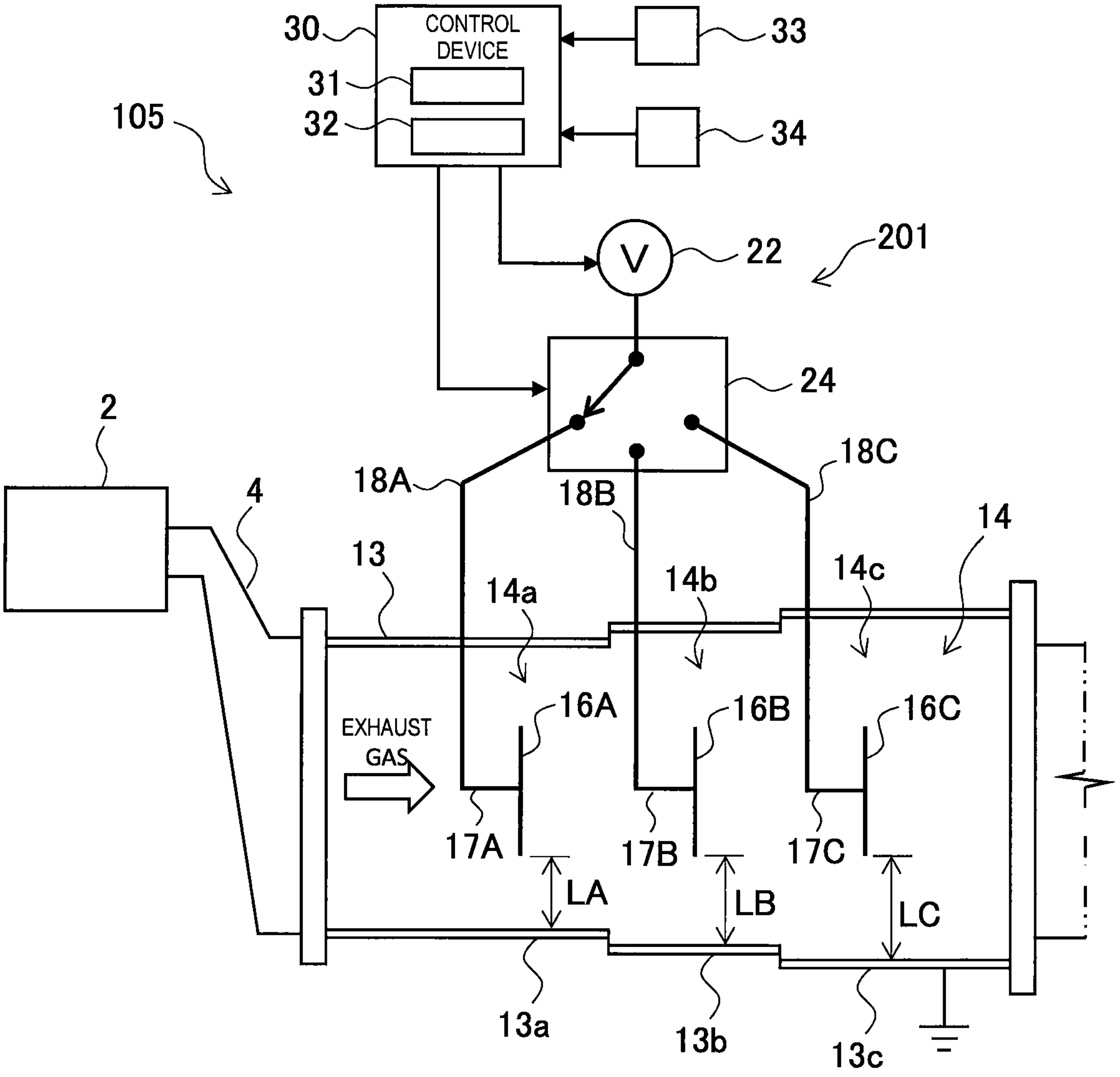
FIG. 16 is a view illustrating a configuration of an electric dust collecting apparatus according to a sixth embodiment of the present disclosure.

6-1. Configuration of Electric Dust Collecting Apparatus According to Sixth Embodiment FIG. 16 is a view illustrating the configuration of the electric dust collecting apparatus according to the sixth embodiment. The electric dust collecting apparatus 106 comprises a plurality (three in FIG. 16) of discharge electrodes 16A, 16B, 16C having the same length from the axis center to the tip. Each of the discharge electrodes 16A, 16B, 16C is connected to the common power supply 22 of the voltage applying device 201 as well as the first embodiment. However, the configuration of the voltage applying device is not limited to the above one. The voltage applying device 203 according to the third embodiment (see FIG. 7) or the voltage applying device 204 according to the third embodiment (see FIG. 10) may be connected to the discharge electrodes 16A, 16B, 16C.

The electric dust collecting apparatus 106 according to the present embodiment comprises a housing 13 consisting of a first cylinder part 13*a*, a second cylinder part 13*b* and a third cylinder part 13*c* which have different inner diameters. The first cylinder part 13*a* has the smallest inner diameter, and the third cylinder part 13*c* has the largest inner diameter. Every cylinder parts 13*a*, 13*b*, 13*c* composing the housing 13 function as the ground electrode. The first cylinder part 13*a* surrounds the discharge electrode 16A and forms the discharge region 14*a* together with the discharge electrode 16A. The second cylinder part 13*b* surrounds the discharge electrode 16B and forms the discharge region 14*b* together with the discharge electrode 16B. The third cylinder part 13*c* surrounds the discharge electrode 16C and forms the discharge region 14*c* together with the discharge electrode 16C.

The electrode-to-electrode distances from the discharge electrodes 16A, 16B, 16C to the inner wall surfaces of the cylinder parts 13*a*, 13*b*, 13*c*, which are the ground electrodes, are different for respective discharge electrodes depending on the difference of the diameters of the cylinder parts 13*a*, 13*b*, 13*c*. Specifically, the electrode-to-electrode distance LA from the discharge electrode 16A to the first cylinder part 13*a* is the shortest, the electrode-to-electrode distance LC from the discharge electrode 16C to the third cylinder part 13*c* is the longest, and the electrode-to-electrode distance LB from the discharge electrode 16B to the second cylinder part 13*b* is an intermediate distance.

According to the electric dust collecting apparatus 106 having this configuration, the same effect as the electric dust collecting apparatus 101 (see FIG. 1) according to the first embodiment is obtained. Further, according to the present embodiment, since the housing 13 has the inner diameter that increases step by step toward the exhaust flow direction, the exhaust flow rate is suppressed. By the exhaust flow rate being suppressed, the number of PM that blows through the exhaust flow passage 14 is decreased, and thereby, higher dust collecting performance than the electric dust collecting apparatus 101 according to the first embodiment is obtained.

7. Seventh Embodiment

Next, the seventh embodiment of the present disclosure will be described. The present embodiment is characterized by the configuration of the electric dust collecting apparatus.

Figure 17:
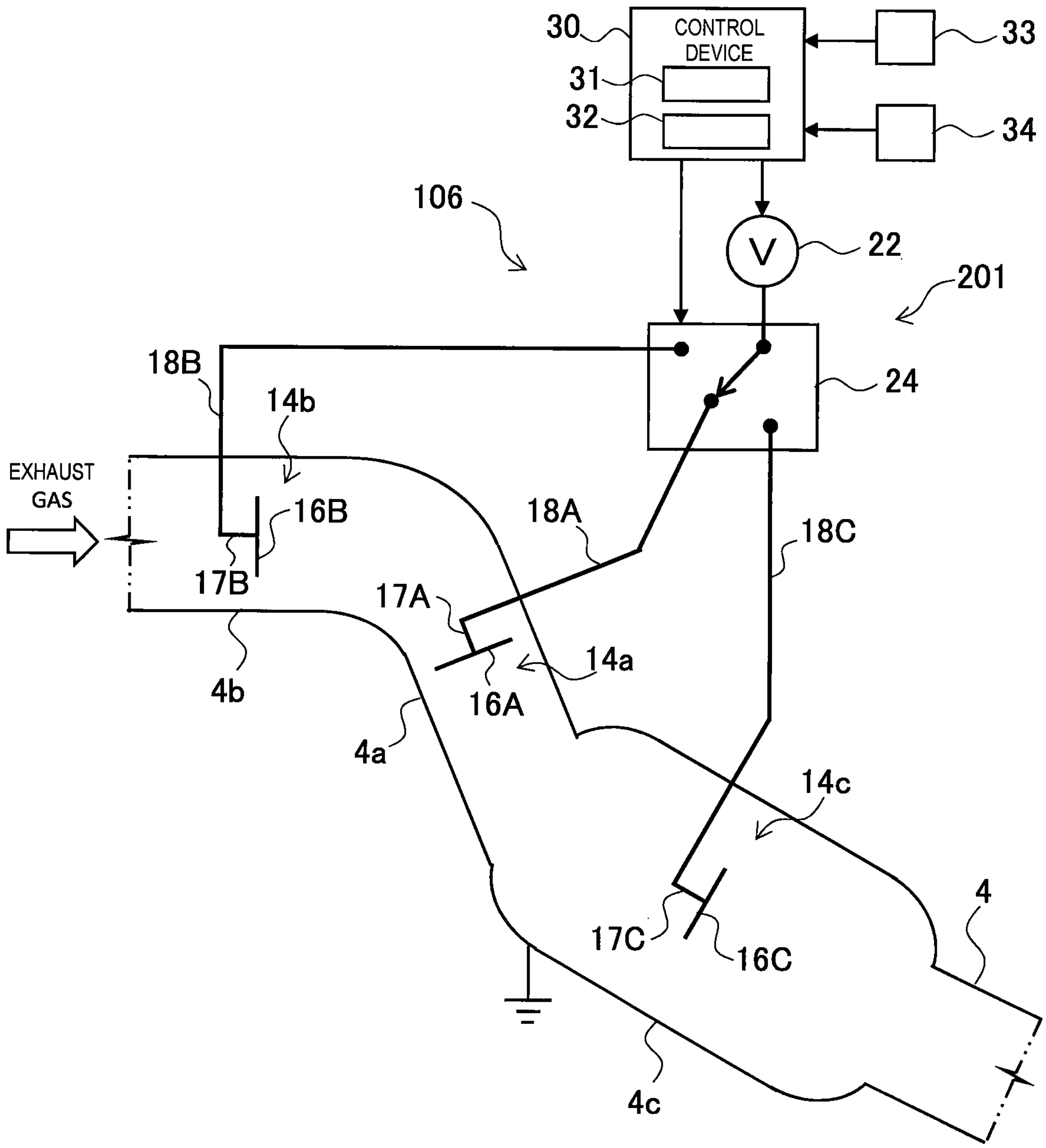
FIG. 17 is a view illustrating a configuration of an electric dust collecting apparatus according to a seventh embodiment of the present disclosure.
Figure 18:
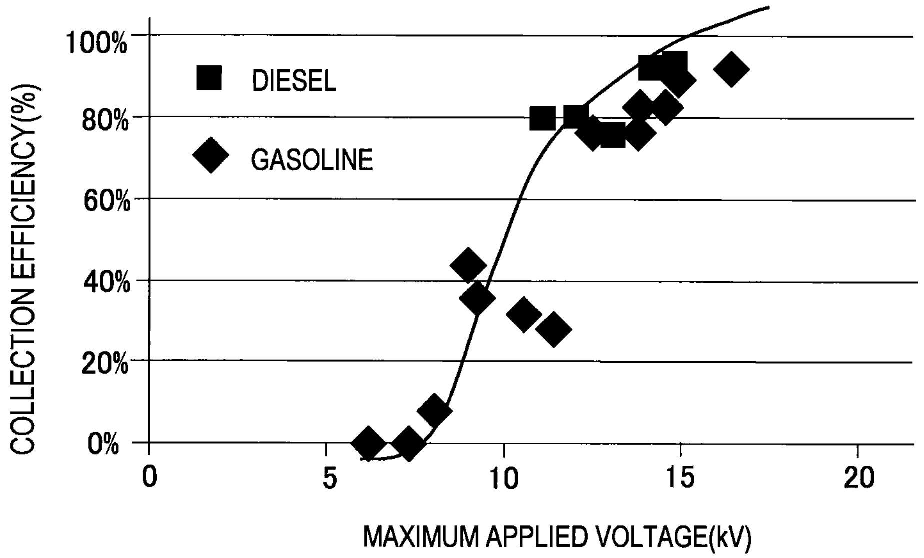
FIG. 18 is a graph showing the relation between a maximum applied voltage that is applicable to the discharge electrode and a collection efficiency of particulate matter.
Figure 19:
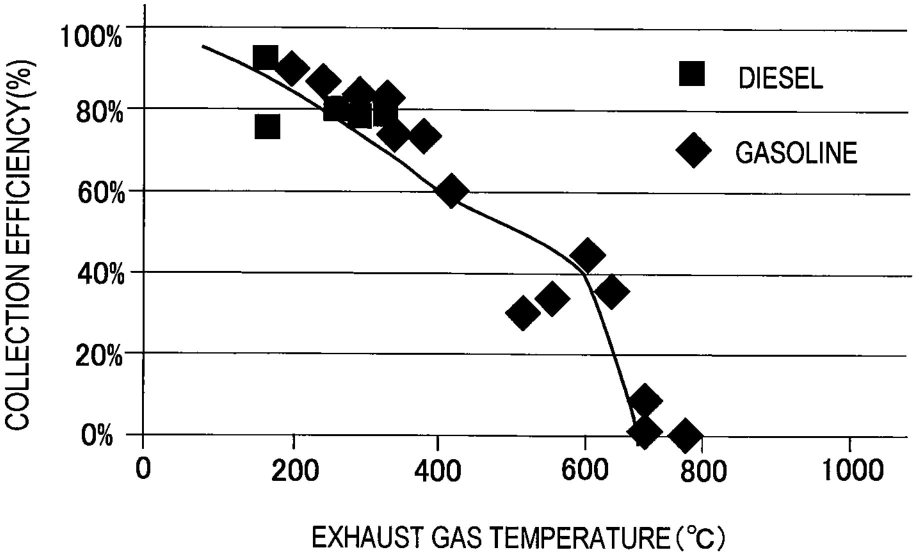
FIG. 19 is a graph showing the relation between a temperatures of exhaust gas entering the electric dust collecting apparatus and a collection efficiency of particulate matter.
Figure 20:
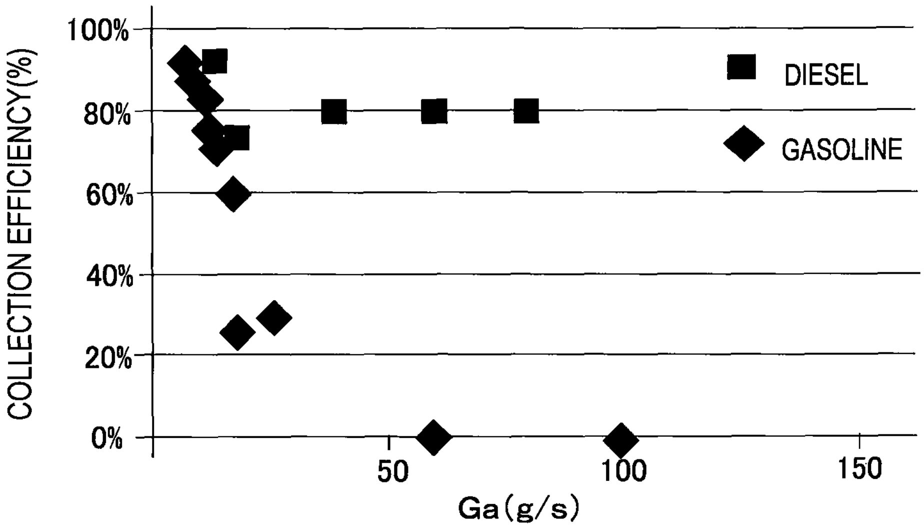
FIG. 20 is a graph showing the relation between an engine load (intake air amount Ga) and a collection efficiency of particulate matter.

7-1. Configuration of Electric Dust Collecting Apparatus According to Seventh Embodiment FIG. 17 is a view illustrating the configuration of the electric dust collecting apparatus according to the seventh embodiment. The electric dust collecting apparatus 107 comprises a plurality (three in FIG. 17) of discharge electrodes 16A, 16B, 16C having the same length from the axis center to the tip. Each of the discharge electrodes 16A, 16B, 16C is connected to the common power supply 22 of the voltage applying device 201 as well as the first embodiment. However, the configuration of the voltage applying device is not limited to the above one. The voltage applying device 203 according to the third embodiment (see FIG. 7) or the voltage applying device 204 according to the third embodiment (see FIG. 10) may be connected to the discharge electrodes 16A, 16B, 16C.

The electric dust collecting apparatus 107 according to the present embodiment doesn't comprise a dedicated housing unlike other embodiments. The discharge electrodes 16A, 16B, 16C are disposed separately in pipe parts 4*a*, 4*b*, 4*c* of the exhaust pipe 4. The pipe parts 4*a*, 4*b*, 4*c* have different diameters. The exhaust pipe 4 is grounded at least at each of the pipe parts 4*a*, 4*b*, 4*c* surrounding the discharge electrodes 16A, 16B, 16C respectively. The respective pipe parts 4*a*, 4*b*, 4*c* of the exhaust pipe 4 function as the ground electrode and form the discharge regions 14*a*, 14*b*, 14*c* together with the discharge electrodes 16A, 16B, 16C.

The electrode-to-electrode distances from the discharge electrodes 16A, 16B, 16C to the inner wall surfaces of the pipe parts 4*a*, 4*b*, 4*c*, which are the ground electrodes, are different for respective discharge electrodes depending on the difference of the diameters of the pipe parts 4*a*, 4*b*, 4*c*. Specifically, the electrode-to-electrode distance from the discharge electrode 16A to the first pipe part 4*a* is the shortest, the electrode-to-electrode distance from the discharge electrode 16C to the third pipe part 4*c* is the longest, and the electrode-to-electrode distance from the discharge electrode 16B to the second pipe part 4*b* is an intermediate distance.

According to the electric dust collecting apparatus 107 having this configuration, the same effect as the electric dust collecting apparatus 101 (see FIG. 1) according to the first embodiment is obtained. Further, according to the present embodiment, the number of parts is reduced by installing the discharge electrodes 16A, 16B, 16C in the existing exhaust pipe 4.

8. Other Embodiments

Each of the above-described embodiments can be implemented in appropriate combination. For example, the correction of the dielectric breakdown temperature and the correction of the maximum applied voltage based on the estimated deposit amount of PM performed in the fifth embodiment can also be applied to the electrode switching control and applied voltage control of the other embodiments.

The characteristic configuration of the sixth embodiment with the electrode-to-electrode distances different for respective discharge regions depending on the diameter of the housing can also be applied to the electric dust collecting apparatus according to the third embodiment and the electric dust collecting apparatus according to the fourth embodiment. Also, the characteristic configuration of the seventh embodiment with the discharge electrodes disposed in the pipe parts having deferent diameters can be applied to the electric dust collecting apparatus according to the third embodiment and the electric dust collecting apparatus according to the fourth embodiment.

In the configuration of the electric dust collecting apparatuses according to the first, the third, the fourth and the sixth embodiments, the electrode-to-electrode distances become longer from the upstream to the downstream of the exhaust flow passage. However, the electrode-to-electrode distances may become shorter from the upstream to the downstream of the exhaust flow passage. It is only necessary that the electrode-to-electrode distances are different between the discharge regions.

Note that the exhaust gas temperature can be measured directly by using a temperature sensor in place of calculating it based on the engine speed and the engine load as in the above embodiments. Also, the electrode switching control and applied voltage control may be executed based on the exhaust gas temperature measured in each discharge region or each discharge electrode in place of the representative temperature.

What is claimed is:

1. An electric dust collecting apparatus that charges and collects particulate matter included in exhaust gas, comprising:

a plurality of discharge electrodes that are disposed in an exhaust flow passage;

a ground electrode that constitutes at least a part of an inner wall surface of the exhaust flow passage; and a voltage applying device that is configured to apply voltage selectively from a common power supply to each of the plurality of discharge electrodes, wherein a plurality of discharge regions, each of which includes at least one discharge electrode of the plurality of discharge electrodes, are provided in the exhaust flow passage and an electrode-to-electrode distance between the at least one discharge electrode and the ground electrode is different in each of the plurality of discharge regions; and wherein the voltage applying device applies voltage to the at least one discharge electrode for each discharge region via a switch, and operates the switch to change a discharge region where voltage is applied to the at least one discharge electrode in accordance with a temperature region to which exhaust gas temperature belongs.

2. The electric dust collecting apparatus according to claim 1, wherein the voltage applying device varies the voltage applied to the at least one discharge electrode included in the discharge region connected to the common power supply via the switch in accordance with the temperature region to which the exhaust gas temperature belongs.

3. The electric dust collecting apparatus according to claim 1, wherein the temperature region where voltage is applied to the at least one discharge electrode is set lower in a discharge region where the electrode-to-electrode distance is shorter than in a discharge region where the electrode-to-electrode distance is longer.

4. The electric dust collecting apparatus according to claim 3, wherein the switch is a selector switch that changes the at least one discharge electrode connected to the common power supply for each discharge region; and wherein the voltage applying device operates the selector switch to select a discharge region to which voltage is applied in accordance with the temperature region to which the exhaust gas temperature belongs.

5. The electric dust collecting apparatus according to claim 3, wherein the voltage applied to the at least one discharge electrode is set higher in a discharge region where the electrode-to-electrode distance is shorter than in a discharge region where the electrode-to-electrode distance is longer.

6. The electric dust collecting apparatus according to claim 1, wherein an upper limit temperature of the temperature region where voltage is applied to the at least one discharge electrode is set lower in a discharge region where the electrode-to-electrode distance is shorter than in a discharge region where the electrode-to-electrode distance is longer.

7. The electric dust collecting apparatus according to claim 6, wherein the upper limit temperature is set for each discharge region;

wherein the switch is an on-off switch that turns on and off the connection between the common power supply and the at least one discharge electrode for each discharge region;

wherein, when the exhaust gas temperature has reached the upper limit temperature set for a certain discharge region, the voltage applying device operates the on-off switch to turn off the connection between the common power supply and the at least one discharge electrode in the certain discharge region corresponding to the upper limit temperature which the exhaust gas temperature has reached; and wherein, when the exhaust gas temperature falls below the upper limit temperature set for a certain discharge region, the voltage applying device operates the on-off switch to turn on the connection between the common power supply and the at least one discharge electrode in the certain discharge region corresponding to the upper limit temperature which the exhaust gas temperature has fallen below.

8. The electric dust collecting apparatus according to claim 6, wherein an applicable voltage that is applicable to the at least one discharge electrode is set lower in a discharge region where the electrode-to-electrode distance is shorter than in a discharge region where the electrode-to-electrode distance is longer; and wherein the voltage applying device sets the applicable voltage set for a discharge region where the electrode-to-electrode distance is shortest among target discharge regions where voltage is applied to the at least one discharge electrode as the applied voltage for all the target discharge regions.

9. The electric dust collecting apparatus according to claim 1, wherein the voltage applying device corrects the voltage applied to the at least one discharge electrode included in the discharge region connected to the common power supply via the switch in accordance with an estimated deposit amount of the particulate matter deposited on the at least one discharge electrode or the ground electrode.

10. The electric dust collecting apparatus according to claim 1, wherein a distance from an axis center of the at least one discharge electrode to the ground electrode is identical among the plurality of discharge regions, a length from the axis center to a tip of the at least one discharge electrode is different in each of the plurality of discharge regions, and thereby the electrode-to-electrode distance is different in each of the plurality of discharge regions.

11. The electric dust collecting apparatus according to claim 1, wherein a distance from an axis center of the at least one discharge electrode to the ground electrode is different in each of the plurality of discharge regions, a length from the axis center to a tip of the at least one discharge electrode is identical among the plurality of discharge regions, and thereby the electrode-to-electrode distance is different in each of the plurality of discharge regions.

12. The electric dust collecting apparatus according to claim 10, wherein the exhaust flow passage is formed in a housing installed in an exhaust pipe of an internal combustion engine, wherein the plurality of discharge regions are provided in the housing.

13. The electric dust collecting apparatus according to claim 11, wherein the plurality of discharge regions are provided separately at pipe parts of the exhaust pipe, the pipe parts having different diameters from each other.

14. An electric dust collecting apparatus that charges and collects particulate matter included in exhaust gas, comprising;

a plurality of discharge electrodes that are disposed in an exhaust flow passage;

a ground electrode that constitutes at least a part of an inner wall surface of the exhaust flow passage; and a voltage applying device that is configured to apply voltage to each of the plurality of discharge electrodes;

wherein a plurality of discharge regions, each of which includes at least one discharge electrode of the plurality of discharge electrodes, are provided in the exhaust flow passage and an electrode-to-electrode distance between the at least one discharge electrode and the ground electrode is different in each of the plurality of discharge regions; and wherein the voltage applying device applies voltage from an individual power supply, that is provided for each of the plurality of discharge regions to the at least one discharge electrode for each discharge region, and operates the individual power supply to change a discharge region where voltage is applied to the at least one discharge electrode in accordance with a temperature region to which exhaust gas temperature belongs.

15. The electric dust collecting apparatus according to claim 14, wherein the voltage applying device varies the voltage applied to the at least one discharge electrode included in the discharge region connected to the common power supply via the switch in accordance with the temperature region to which the exhaust gas temperature belongs.

16. The electric dust collecting apparatus according to claim 14, wherein an upper limit temperature of the temperature region where voltage is applied to the at least one discharge electrode is set lower in a discharge region where the electrode-to-electrode distance is shorter than in a discharge region where the electrode-to-electrode distance is longer.

17. The electric dust collecting apparatus according to claim 14, wherein the voltage applying device corrects the voltage applied to the at least one discharge electrode included in the discharge region connected to the common power supply via the switch in accordance with an estimated deposit amount of the particulate matter deposited on the at least one discharge electrode or the ground electrode.

18. The electric dust collecting apparatus according to claim 14, wherein a distance from an axis center of the at least one discharge electrode to the ground electrode is identical among the plurality of discharge regions, a length from the axis center to a tip of the at least one discharge electrode is different in each of the plurality of discharge regions, and thereby the electrode-to-electrode distance is different in each of the plurality of discharge regions.

19. The electric dust collecting apparatus according to claim 14, wherein a distance from an axis center of the at least one discharge electrode to the ground electrode is different in each of the plurality of discharge regions, a length from the axis center to a tip of the at least one discharge electrode is identical among the plurality of discharge regions, and thereby the electrode-to-electrode distance is different in each of the plurality of discharge regions.

20. The electric dust collecting apparatus according to claim 18, wherein the exhaust flow passage is formed in a housing installed in an exhaust pipe of an internal combustion engine, wherein the plurality of discharge regions are provided in the housing.

* * * * *